US010129484B2

(12) United States Patent
Davis et al.

(10) Patent No.: US 10,129,484 B2
(45) Date of Patent: *Nov. 13, 2018

(54) OPTICAL FILTER OPACITY CONTROL FOR REDUCING TEMPORAL ALIASING IN MOTION PICTURE CAPTURE

(71) Applicant: RED.COM, LLC, Irvine, CA (US)

(72) Inventors: Anthony Wayne Davis, Los Alamos, NM (US); John Rodrigue Kouns, Los Alamos, NM (US)

(73) Assignee: RED.COM LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,667

(22) Filed: May 12, 2017

(65) Prior Publication Data

US 2017/0257549 A1 Sep. 7, 2017

Related U.S. Application Data

(63) Continuation of application No. 14/553,099, filed on Nov. 25, 2014, now Pat. No. 9,686,474, which is a (Continued)

(51) Int. Cl.
*H04N 5/235* (2006.01)
*G03B 9/08* (2006.01)
(Continued)

(52) U.S. Cl.
CPC .......... *H04N 5/2353* (2013.01); *G02B 5/204* (2013.01); *G03B 9/08* (2013.01); *G03B 9/10* (2013.01);
(Continued)

(58) Field of Classification Search
CPC .. H04N 5/2352; H04N 5/2353; H04N 5/2256; G02B 5/20; G02B 5/24; G03B 9/08; G03B 9/10
See application file for complete search history.

(56) References Cited

U.S. PATENT DOCUMENTS 2,351,932 A 6/1944 Deckel et al.
2,514,302 A 7/1950 Aiken
(Continued)

FOREIGN PATENT DOCUMENTS

CN 1402530 A 3/2003
CN 1856730 A 11/2006
(Continued)

OTHER PUBLICATIONS

Fuchs et al., "A Shaped Temporal Filter Camera," VMV 2009, http://www.mpi-int.mpg.de/resources/stfcamera/stfcamera.pdf, in 10 pages, accessed on Feb. 6, 2014.
(Continued)

*Primary Examiner* — Ngoc-Yen Vu
(74) *Attorney, Agent, or Firm* — Knobbe, Martens, Olson & Bear LLP

(57) ABSTRACT

The present invention comprises a system for and method of frequency prefiltering comprising a camera shutter capable of continuously variable illumination during a single exposure of the sensor. The shutter comprises a continuously variable exposure effector which in disposed in an image path, either in front of a lens or between a lens and a sensor. The system for frequency prefiltering further comprises a synchronization cable that synchronizes a drive system with a sensor or with film. The shutter further comprises a postfilter. The postfilter comprises a digital finite impulse response convolutional filter.

24 Claims, 30 Drawing Sheets

Related U.S. Application Data continuation of application No. 13/102,244, filed on May 6, 2011, now Pat. No. 8,908,081.

(60) Provisional application No. 61/381,341, filed on Sep. 9, 2010.

(51) Int. Cl.
| | | |
|---|---|---|
| H04N 5/238 | (2006.01) | |
| G03B 9/10 | (2006.01) | |
| H04N 5/225 | (2006.01) | |
| H04N 5/232 | (2006.01) | |
| G02B 5/20 | (2006.01) | |

(52) U.S. Cl.
CPC ......... *H04N 5/2254* (2013.01); *H04N 5/2256* (2013.01); *H04N 5/238* (2013.01); *H04N 5/23229* (2013.01)

(56) References Cited

U.S. PATENT DOCUMENTS

| | | |
|---|---|---|
| 3,270,646 A | 9/1966 | Wilson |
| 4,812,911 A | 3/1989 | Ohshima et al. |
| 4,889,424 A | 12/1989 | Saiki |
| 5,063,450 A | 11/1991 | Pritchard |
| 5,619,266 A | 4/1997 | Tomita et al. |
| 5,691,830 A | 11/1997 | Dickson et al. |
| 5,850,277 A | 12/1998 | Dang et al. |
| 6,040,857 A | 3/2000 | Hirsh et al. |
| 6,088,058 A | 7/2000 | Mead et al. |
| 6,115,556 A | 9/2000 | Reddington |
| 6,456,345 B1 | 9/2002 | Ise |
| 6,720,742 B2 | 4/2004 | Yanagida et al. |
| 6,791,657 B2 | 9/2004 | Yanagida et al. |
| 6,804,037 B1 | 10/2004 | Nito et al. |
| 6,864,916 B1 | 3/2005 | Nayar |
| 6,876,412 B2 | 4/2005 | Udaka et al. |
| 7,057,683 B2 | 6/2006 | Udaka et al. |
| 7,106,377 B2 | 9/2006 | Bean |
| 7,110,155 B2 | 9/2006 | Nito et al. |
| 7,230,598 B2 | 6/2007 | Kawabata et al. |
| 7,339,649 B2 | 3/2008 | Imai et al. |
| 7,394,498 B2 | 7/2008 | Takaoka |
| 7,428,378 B1 | 9/2008 | Furlan |
| 7,450,170 B2 | 11/2008 | Terai |
| 7,483,116 B2 | 1/2009 | Udaka |
| 7,492,409 B2 | 2/2009 | Yanagida |
| 7,557,857 B2 | 7/2009 | Tsuda |
| 7,564,019 B2 | 7/2009 | Olsen et al. |
| 7,573,524 B2 | 8/2009 | Tsuji et al. |
| 7,612,805 B2 | 11/2009 | Solomon |
| 7,633,563 B2 | 12/2009 | Ohishi et al. |
| 7,639,294 B2 | 12/2009 | Ito |
| 7,705,883 B2 | 4/2010 | Stavely et al. |
| 7,755,678 B2 | 7/2010 | Goris et al. |
| 7,924,321 B2 | 4/2011 | Nayar et al. |
| 7,924,517 B2 | 4/2011 | Ambar |
| 8,004,619 B2 | 8/2011 | Ohishi et al. |
| 8,013,930 B2 | 9/2011 | Tengeiji |
| 8,228,418 B2 | 7/2012 | Pillman et al. |
| 8,237,830 B2 | 8/2012 | Jannard et al. |
| 8,319,866 B2 | 11/2012 | Yamano |
| 8,525,924 B2 | 9/2013 | Jannard |
| 8,525,925 B2 | 9/2013 | Jannard |
| 8,648,899 B2 | 2/2014 | Henkinet et al. |
| 2001/0012067 A1 | 8/2001 | Spitzer et al. |
| 2003/0020958 A1 | 1/2003 | Bean |
| 2003/0030730 A1 | 2/2003 | Nakayama |
| 2003/0052989 A1 | 3/2003 | Bean et al. |
| 2003/0113014 A1 | 6/2003 | Katoh |
| 2004/0223075 A1 | 11/2004 | Furlan et al. |
| 2004/0233308 A1 | 11/2004 | Elliott et al. |
| 2007/0248349 A1 | 10/2007 | Nanjo |
| 2007/0257184 A1 | 11/2007 | Olsen et al. |
| 2007/0263118 A1 | 11/2007 | Sato et al. |
| 2008/0002029 A1 | 1/2008 | He et al. |
| 2008/0007748 A1 | 1/2008 | Borg |
| 2008/0158372 A1 | 7/2008 | Palum et al. |
| 2008/0278621 A1 | 11/2008 | Cho et al. |
| 2008/0303927 A1 | 12/2008 | Khanh |
| 2009/0059101 A1 | 3/2009 | Wang et al. |
| 2009/0096815 A1 | 4/2009 | Fukuda |
| 2009/0096915 A1 | 4/2009 | Kelly et al. |
| 2009/0180009 A1 | 7/2009 | Kanade et al. |
| 2009/0190918 A1 | 7/2009 | Chang |
| 2010/0033604 A1 | 2/2010 | Solomon |
| 2010/0157082 A1 | 6/2010 | Katerberg |
| 2010/0238328 A1 | 9/2010 | Pillman et al. |
| 2010/0259824 A1 | 10/2010 | Mitsuhashi |
| 2011/0157419 A1 | 6/2011 | Nayar et al. |
| 2011/0254998 A1 | 10/2011 | Bourdon et al. |
| 2012/0114325 A1 | 5/2012 | Take et al. |
| 2012/0120282 A1 | 5/2012 | Goris |
| 2012/0268578 A1 | 10/2012 | Vertikov et al. |
| 2015/0350564 A1 | 12/2015 | Sano |
| 2016/0341973 A1* | 11/2016 | Ida .......................... G02B 27/58 |

FOREIGN PATENT DOCUMENTS

| | | |
|---|---|---|
| EP | 2200277 | 6/2010 |
| JP | H05-091388 | 4/1993 |
| JP | 2000-227618 | 8/2000 |
| JP | 2003-131189 A | 5/2003 |
| JP | 2005-128129 | 5/2005 |
| JP | 2006-135770 | 5/2006 |
| JP | 2006-180564 | 7/2006 |
| JP | 2007-208610 | 8/2007 |
| JP | 2009-258491 | 11/2009 |
| KR | 10-2008-0048113 | 6/2008 |

OTHER PUBLICATIONS

M. Fuchs, T. Chen, O. Wang, R. Raskar, H-P. Seidel, H. Lensch; A Shaped Temporal Filter Camera; technical reports of the Max-Planck-Institut fur Informatik; MPI-I-2009-4-003 Jun. 2009; Germany. see http://www.visus.uni-stuttgart.de/~fuchsmn/publications/RR-AShapedTemporalFilterCamera.300dpi.pdf.

International Search Report and Written Opinion for PCT Application No. PCT/US2011/035495 dated Jan. 3, 2014, in 14 pages.

D. Purves, J. Paydarfar, T. Andrews; The Wagon Wheel Illusion in Movies and Reality; Proc. Natl. Acad. Sci. USA; Apr. 1996; pp. 3693-3697; vol. 93; PNAS, Washington, DC, USA.

R. Raskar, A. Agrawal, J. Tumblin; Coded Exposure Photography: Motion Deblurring using Fluttered Shutter; ACM Transactions on Graphics (TOG)—Proceedings of ACM SIGGRAPH 2006, vol. 25 Issue 3, Jul. 2006, pp. 795-804, New York, NY, USA.

Shechtman et al., "Increasing Space-Time Resolution in Video," ECCV 2002, LNCS 2350, pp. 753-768, 2002.

International Search Report and Written Opinion for Application No. PCT/US2014/032871, dated Aug. 14, 2014, in 10 pages.

Office Action for related European Application No. 11785502.3-1502, dated Jul. 11, 2016, in 4 pages.

Summons to Attend Oral Proceedings for EP Application No. 11785502.3, dated Jan. 5, 2018, in 6 pages.

Examiner's Comments on Written Submissions for EP Application No. 11785502.3, dated Apr. 13, 2018, in 3 pages.

Custom Liquid Crystal Capabilities, Meadowlark Optics Polarization Solutions, https://web.archive.org/web/20031114104930/http://meadowlark.com:80/pdfs/LiquidCrystals.PDF, 2003, in 14 pages.

Merke, et al., Liquid Crystal in Precision Optical Devices, Meadowlark Optics Polarization Solutions, Colorado, 2005, in 8 pages.

Minutes of Oral Proceedings before Examining Division for European Application No. 11 785 502.3, dated May 29, 2018, in 6 pages.

\* cited by examiner

A

B

OPTICAL FILTER OPACITY CONTROL FOR REDUCING TEMPORAL ALIASING IN MOTION PICTURE CAPTURE

CROSS-REFERENCE TO RELATED APPLICATIONS

This application is a continuation of U.S. patent application Ser. No. 14/553,099, filed Nov. 25, 2014, titled "OPTICAL FILTER OPACITY CONTROL FOR REDUCING TEMPORAL ALIASING IN MOTION PICTURE CAPTURE," which is a continuation of U.S. patent application Ser. No. 13/102,244, filed May 6, 2011, titled "OPTICAL FILTER OPACITY CONTROL FOR REDUCING TEMPORAL ALIASING IN MOTION PICTURE CAPTURE," which claims the benefit of U.S. Provisional Application No. 61/381,341, filed Sep. 9, 2010 titled "APPARATUS AND METHOD FOR IMPROVED MOTION PICTURE CAMERAS." The entire contents of these applications are incorporated by reference herein and made part of this specification.

BACKGROUND OF THE INVENTION

Field of the Invention (Technical Field)

The present invention relates to a shutter apparatus comprising a continuously variable exposure effector and method for improving filtering in conventional two-dimensional (2D) or three-dimensional (3D) cameras resulting in reducing or preventing temporal aliasing.

Motion picture film cameras known by those having ordinary skill in the art expose film by allowing light to pass through a lens opening and then through a shutter aperture. The shutter typically rotates at a speed synchronous with that of the passing film frames. Digital motion picture cameras expose the sensor by electronically controlling the exposure time for each frame to achieve the same effect.

The shutter in most motion-picture film cameras is a focal plane type and is called a rotary disk shutter. Inside a film camera is a rotary shutter shaped like a semicircle. FIG. 1 illustrates a typical motion picture camera shutter consisting of an opaque region and an open region. When the camera operates, the shutter mechanism turns to the open position to let light hit the film and then continues turning, blocking light as the next frame moves into place.

A rotary disk shutter is a pie-shaped mirror disk that has a segment cut out, causing the shutter to have a light and dark cycle as the disk rotates. The film is exposed when the cutout segment of the shutter passes in front of the film. The film is subsequently advanced during the dark cycle. As the mirror disk spins it reflects an image through a ground glass so that it can be viewed by the camera operator part of the time. The other part of the time the mirror allows the light to pass on to the film. On simple cameras this shutter is fixed and usually semi-circular. On more advanced cameras the shape of the shutter can be adjusted to a particular setting. This shutter setting is referred to as the shutter angle.

Many motion-picture film camera shutters are adjustable. Imagine two semicircles pinned together: the amount of space left open could never be more than 180 degrees (half a circle), but it could be less, if the two semicircles were fanned out so a smaller space is exposed. The angle of exposed space is called the shutter angle. The standard shutter angle in a film camera is 180 degrees. Sometimes angles of less than 180 are used for aesthetic or logistical reasons, and thus the amount of time each frame is exposed to light is actually less than half the frame rate. Digital motion picture cameras do not have a mechanical shutter, so the resulting exposure time on digital cameras is controlled electronically to simulate the same shutter angle controls.

Adjusting the shutter angle controls the proportion of time that the film is exposed to light during each frame interval. The primary reason that cinematographers adjust the shutter angle is to control the amount of motion blur that is recorded on each successive frame of film. A tight shutter angle will constrict motion blur. A wide shutter angle will allow it. A 180° shutter angle is considered normal.

The use of a rotary disk shutter introduces aliasing. Aliasing literally means "by a different name" and is used to explain the effect of under-sampling a continuous signal, which causes real world frequencies to be rendered in a sampled system as different frequencies. This aliased signal is the original signal shifted to a different frequency and is usually seen as higher frequencies being aliased to lower frequencies.

Aliasing occurs when something continuous is represented by using lots of discrete chunks, for example, representing pictures by using many pixels, storing sounds by taking many samples, or showing movement by using many still pictures. The process of trying to represent continuous things in discrete chunks inevitably distorts the information. This distortion introduces ambiguities into the sound or pictures and "wrong" things are seen, i.e. aliases are seen. For example, for a one-dimensional audio signal in time, the aliased frequency components sound lower in pitch. In a two-dimensional space, such as with images, parallel lines in pinstripe shirts aliasing into large wavy lines are observed. For two-dimensional signals that vary in time, an example of aliasing would be viewing propellers on a plane that seem to be turning slowly when the propellers are actually moving at very high speeds.

One way to describe a motion picture camera is as a sampling system in time. Motion picture cameras acquire images sequentially in time, with each image representing a sample of the real world in time. In both digital and film based motion picture cameras, the time varying signal is measured at a fixed frame rate, usually 24 frames per second (fps). The sampling rate of typical motion picture cameras is usually 24 cycles per second (or 24 hertz), so the sampling rate (in hertz) is the same number as the frame rate (in frames per second). This type of system may be considered a time-sampling system. The performance of such a sampling system is analyzed and predicted with the well-known Nyquist-Shannon sampling theorem, which states: If a function x(t) contains no frequencies higher than B hertz, it is completely determined by giving its ordinates at a series of points spaced 1/(2B) seconds apart.

The Nyquist frequency is defined as half the sampling frequency. For example, in a 24 frame per second (or 24 cycles per second, or 24 hertz) motion picture camera, the Nyquist frequency would be 12 hertz. The Nyquist-Shannon theorem predicts aliasing when real-world signals with frequencies above the Nyquist frequency are sampled, i.e. any real world signal frequency above the Nyquist rate will be aliased, or shifted into another (false) frequency that can be represented by the sampling system.

Aliasing can and does occur when the real-world frequencies exceed the Nyquist rate since motion picture cameras are sampled systems. Motion picture cameras measure in three dimensions: two spatial dimensions (the two-dimensional image produced for every frame) and also time. Sampling is a discrete observation or measurement, while aliasing is an illusion, an appearance of something that is not, due to shortcomings of sampling.

To understand the time-domain sampling of a motion picture camera, consider a simple light source such as a light bulb photographed with a motion picture camera. If the intensity of the light bulb is modulated sinusoidally, the intensity recorded by the film or digital sensor should correspondingly represent samples of the time-varying brightness of the light bulb, and upon playback the light intensity varying over time should match the sine wave of the original light bulb. The real world continuously varying intensity of the light bulb is recorded as a finite string of discrete values, one value for every frame of the movie.

In the sinusoidally varying light bulb example previously described, with a frequency of the sine wave of 10 hertz, with the light sampled with a normal 24 frame per second camera system, the 10 hertz signal is accurately recorded and reproduced because it is less than the Nyquist frequency of 12 hertz. However, if the light bulb is varied sinusoidally at 14 hertz, the recorded and reproduced frequency from a 24 frame per second camera results is 10 hertz. This is because 14 hertz is 2 hertz above the Nyquist frequency, so the resulting frequency is 2 hertz below the Nyquist frequency. This is an example of signal aliasing when a frequency higher than the Nyquist frequency is sampled.

Temporal aliasing in motion picture cameras is exhibited in other ways. The most common and popularly understood manifestation of temporal aliasing is known as the "wagon wheel" effect resulting from a rotating wheel observed on a television or cinema screen. The effect arises because wheels on film or video sometimes seem to rotate in a direction opposite to the direction of wagon movement, or at a speed that looks "wrong." This effect is particularly pronounced when looking at an old-fashioned wheel on a carriage or wagon, because the greater the number of spokes a wheel has, the easier it is for this phenomenon to be observed. Thus, a rapidly moving wagon wheel captured by a motion picture camera appears to stop, reverse direction, or move slowly, depending on the rate of rotation. The higher frequencies or cycles of the rotating motion are aliased, or falsely shifted, to appear as different frequencies. This temporal aliasing results from the limited frame rate.

The above described backwards motion of wheels is illustrated in FIG. 2 where wheel motion is illustrated as a series of still images or 'frames.' FIG. 2A illustrates three such frames where the wheel is rotated by 7.5 degrees in each frame. FIG. 2B illustrates frames where the wheel is rotated by 42 degrees each time, e.g. the wheel is rotated more quickly than in FIG. 2A. When attention is focused on the small white dot on the rim of the wheel the rotation is still clockwise, and in fairly large increments. But when attention is focused on the spokes of the wheel, the wheel appears to rotate anticlockwise in very small steps. If not for the white marker dot, a clockwise rotation of 42 degrees would look identical to an anti-clockwise rotation of 3 degrees, due to the rotational symmetry of the wheel spokes.

The sequence of images that represent a wheel rotating quickly in one direction happens to look identical to the sequence of images for the same wheel rotating slowly in the opposite direction: this is an example of aliasing. There are many such aliases that can be created. If the rotation happens to occur at exactly the right speed (45 degrees per frame for this particular example) the wheel will appear to stand perfectly still. If it's very slightly faster, the wheel will appear to rotate in the correct direction, but far too slowly with respect to the actual speed of the wheel rotation.

Aliasing decreases the quality of the motion picture. Current practice to address the aliasing issue in moving pictures includes using motion blur. Motion blur entails making each frame an average over the whole interval between one frame and the next instead of making each image in the sequence a sharp snapshot of where items are at a given instant in time. In the wagon wheel example previously described, with motion blur, each spoke is represented as a gray "blurred bar" through the 7.5 degree angle that the spoke sweeps across in that one frame. The first image shows each of the spokes slightly thicker and a bit blurred at the edges.

FIG. 2B is an illustration of wagon wheel spokes sweeping across 42 degrees from one frame to the next, almost the same size as the interval between the spokes. A gray blur rather than individual spokes results. Blurring eliminates aliasing because the wheel no longer appears to be moving backwards, it just looks blurred, which is what is observed "in real life" when looking at a fast-moving wheel.

Using motion blur to eliminate aliasing is not a straightforward process. The method employed to eliminate aliasing in sampling systems is to band-limit the real-world signal before the sampling takes place, thus ensuring that no frequencies above the Nyquist frequency are allowed to enter the sampling system. This is known as prefiltering and is usually accomplished with a low-pass frequency filter. The ideal low-pass frequency filter for prefiltering is unity (signal unaffected) below the Nyquist frequency, and zero (no signal allowed) above the Nyquist frequency.

State of the art motion picture camera prefiltering using an exposure window and shutter angle has limitations. Motion picture cameras embody some inherent prefiltering, because the amount of time the shutter is open causes some motion blurring on a single frame/sample.

Exposure time for a frame is typically indicated as a shutter angle. A 360-degree shutter angle indicates the frame is exposed for the entire time of the sample, while a 180 degree shutter angle indicates the frame is exposed for half of the time between samples. For example, in a 24 frame per second motion picture system, a 180-degree shutter would expose each frame for ⅟48 of a second, while a 360-degree shutter would expose each frame for ⅟24 of a second.

When the amount of light allowed to pass to the sensor, whether film or a digital sensor, during the frame time is plotted as a function of time, the resulting plot describes how the incoming image intensity changes over time. This change in intensity over time is called the exposure window function, or simply the window function. Exposure window functions for motion picture shutters have a sharp transition between 0 (no light) and 1 (full exposure). Existing motion picture cameras do not implement values other than 0 and 1 because the shutter is either open or closed.

Filters are represented by response to a given frequency; one such representation is called the modulation transfer function, or MTF. The modulation transfer function when expressed linearly is normalized between 0 and 1, where 1 is full response to a given frequency and 0 is no response. There is a direct mathematical relationship between the exposure window function and the frequency prefilter. If an exposure window function is known, the resulting modulation transfer function of the prefilter can be calculated. FIG. 3 illustrates the MTFs of the effective prefiltering of a 180-degree and a 360-degree shutter angle compared with an ideal prefilter for a 24 frame per second system (Nyquist frequency is therefore 12 hertz).

Regardless of at what speed the film itself is running through the camera, half the time the shutter is open, exposing the film, and half the time, the shutter is closed, advancing the film. The shutter speed of a film camera, or how long each image is exposed to light, is half the frame rate or how many images are exposed each second. The cinematic standard frame rate of 24 frames per second uses a shutter speed half of that, i.e. $\frac{1}{48}$ of a second.

Ideally, all frequencies above Nyquist would be eliminated before sampling takes place, and all frequencies below Nyquist would be preserved without attenuation. This ideal modulation transfer function of a prefilter is plotted in FIG. 4.

If the illumination of the sensor is plotted over the course of an exposure, the resulting plot is called the exposure window function. For a standard 180-degree shutter, the exposure window function has only two values: 0 (fully dark) and 1 (fully light). The function starts at 0 (closed), and then instantly transitions to 1 (fully open and light). It remains fully open at 1 for $\frac{1}{48}$ seconds. It then instantly transitions to 0. In the more general case, a plurality of exposure window functions might be considered, with values ranging infinitely between 0 and 1.

For 24 fps film, a 180° shutter is currently used so the film is exposed for $\frac{1}{48}^{th}$ seconds. FIG. 5 illustrates a resulting illumination window function of the average illumination of a sensor, where 0 is no illumination and 1 is full illumination, as a function of angle traced out over a circle. Thus, the transition from open to shut is abrupt and the sides of the so-called "boxcar" window are steep. When this shutter is rotated, the image illumination transmitted to the sensor is at zero intensity half of the time when the opaque region is in front of the sensor, and at full intensity the other half of the time when the open region is in front of the sensor.

FIG. 6 illustrates a plot of exposure vs. time of an ideal exposure window function plotted over that of a window created by a semi-circular shutter. The ideal window is infinite in length, and therefore not physically realizable.

Currently, general window functions exist in the known art, but window functions applied to exposure having values other than 0 or 1 (fully closed or fully open) have not been applied to imaging systems. In order to tune a good frequency response, data values need to be captured over an extended period of time and with exposure window functions that can produce illumination other than fully dark and fully illuminated; i.e. continually varying illumination in between dark and light. The present invention addresses this deficiency by comprising an apparatus and method of producing continually varying illumination.

The present invention comprises a shutter apparatus and method of using the shutter that more closely approaches creating an ideal exposure window function, thus eliminating the abrupt open-close transition seen in cameras currently used. The shutter apparatus of the present invention thus reduces or eliminates aliasing.

The present invention comprises an improved analog filter and method of using the filter in time domain sampling. The present invention additionally comprises a method of implementing an analog filter on the time domain sampling.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

SUMMARY OF THE INVENTION

The present invention comprises a system for frequency prefiltering comprising a sensor, a shutter comprising a continuously variable exposure effector, an electronic drive system comprising a motor drive for generating an electronic control signal for driving the variable exposure effector, and a synchronization cable for synchronizing the electronic signal generator and the electronic drive system with the sensor. The shutter further comprises a postfilter comprising a digital finite impulse response convolutional filter.

The variable exposure effector comprises a liquid crystal comprising a plate comprising a variable opacity panel or alternately comprising a plurality of panels disposed adjacent to a lens, or a rotatable exposure control wafer. The rotatable exposure control wafer of the present invention comprises perforations disposed in a randomly distributed pattern or micropattern extending through the wafer. The rotatable exposure control wafer of the present invention also comprises rigid variable color-neutral opacity material comprising a variable color-neutral opacity material comprising a transparent area, an opaque area, and a semi-transparent area.

The system for frequency prefiltering further comprises at least one additional synchronization cable connecting the sensor to the electronic signal generator, and an image splitter, and a camera phase shift detection system.

The camera phase shift detection system comprises a sequence wand comprising a series of indicator devices, a control box, a camera, and a synchronization cable connecting the control box and the sequence wand comprising a LED wand. The indicator devices comprise visible electromechanical or electromechanical indicator devices.

The variable exposure effector further comprises a first optical polarizer and a second optical polarizer wherein the first optical polarizer comprises a rotatable optical polarizer and the second optical polarizer of claim 17 comprising a rotatable optical polarizer.

The system for frequency prefiltering further comprises a lens, at least two cameras viewing a scene through the lens, an image splitter adjacent to the lens; and an additional system for frequency prefiltering.

The present invention further comprises a method of frequency prefiltering comprising creating an exposure window function, providing continuous exposure values, tuning a frequency response, sampling an image sequence, and reducing aliasing in the resultant sequence. The method of frequency prefiltering further comprises disposing a shutter in an image path, generating an electronic signal, driving the signal to an electronic image sensor, continuously varying illumination while exposing the sensor, driving a variable exposure effector, and synchronizing the electronic signal generator and the electronic drive system with the sensor.

The method of frequency prefiltering further comprises exposing a single frame, directly modulating an electronic shutter of the sensor, and modulating sensitivity.

The method of continuously varying illumination further comprises electrically driving a liquid crystal, varying opacity of the liquid crystal, disposing a plurality of liquid crystal panels adjacent to a lens, and electrically rotating an exposure control wafer.

The method of continuously varying illumination further comprises disposing locally random perforations through the exposure control wafer, rotating the exposure control wafer; and creating a global average desired exposure window function, and rotating a rigid material comprising a variable color-neutral opacity exposure control wafer. The method of continuously varying illumination further comprises rotating a first optical polarizer, adjusting the angular rotation rate of the first optical polarizer, producing an exposure window function, and disposing a second optical polarizer adjacent to a first optical polarizer. The method of continuously varying illumination of claim 31 further comprises rotating the second optical polarizer averaging over all polarization angles in the incident light and acquiring frames, and applying a digital finite impulse response postfilter to the image sequence, compensating for low-frequency loss resulting from the prefilter, and correcting the base band frequency to near unity response. The method of continually varying illumination is accomplished using a still photography camera or a time-lapse system.

The method of frequency prefiltering further comprises connecting the sensor to the electronic signal generator via at least one additional synchronization cable, disposing an image splitter, operating two sensors simultaneously, operating two exposure control effectors simultaneously, operating two sensors and exposure control effectors 180 degrees out of phase with one another; and interleaving the image sequences from the two sensors to create a single resulting sequence with desired frequency response.

The present invention further comprises a method of detecting camera phase shift comprising indicating visible energy via a sequence wand comprising a LED wand, controlling the sequence wand via a control box, disposing a camera for viewing the sequence wand, and connecting a synchronization cable to the control box and the sequence wand.

BRIEF DESCRIPTION OF THE SEVERAL VIEWS OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is directed to a method and apparatus for reducing temporal aliasing in motion picture cameras and improving the performance of cameras.

An embodiment of the present invention comprises a prefilter incorporating exposure window functions shaped differently from window functions currently used. The prefilter of the present invention exhibits transitional values other than 0 (fully closed) and 1 (fully open). The use of the prefilter of the present invention results in a different, improved modulation transfer function that is produced prior to sampling.

The prefilter of the present invention produces exposure windows that are continuously varied. The variation results in an MTF with improved capability to reduce aliasing frequencies.

Figure 1:
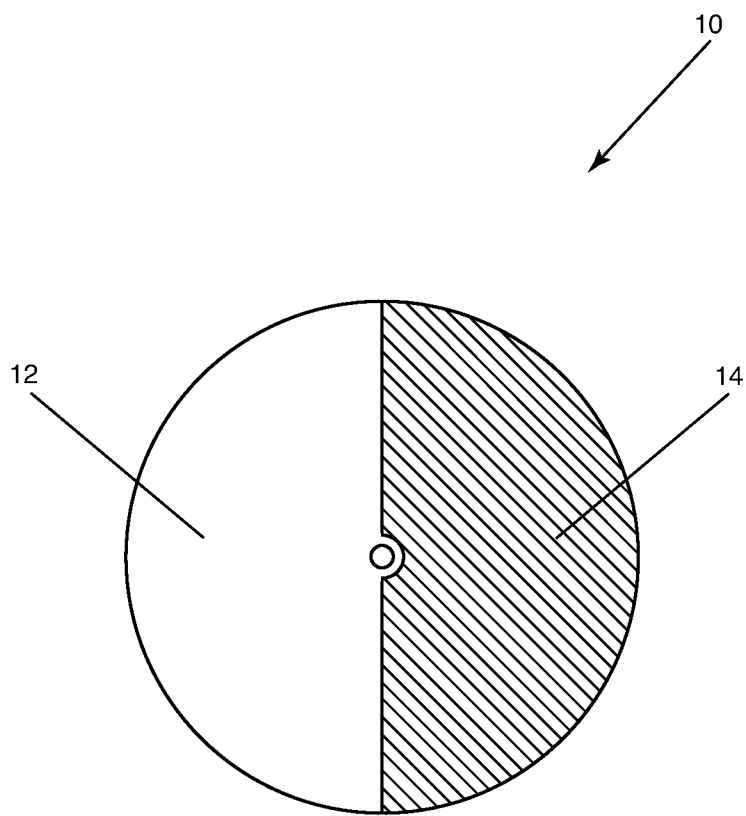
FIG. 1 is an illustration of a typical motion picture camera shutter disk.
Figure 2A:
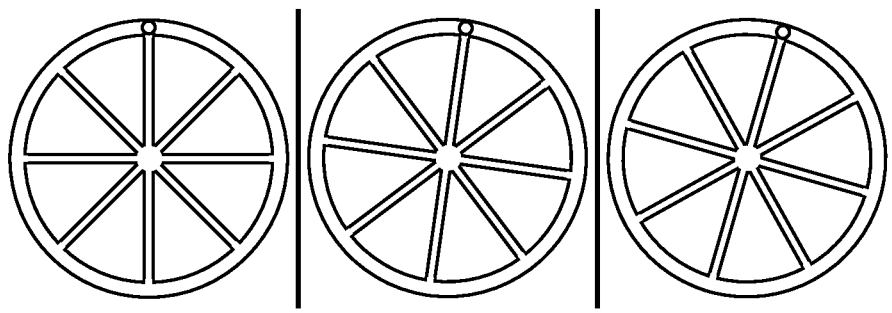
FIGS. 2A and 2B illustrate an example of temporal aliasing.
Figure 2B:
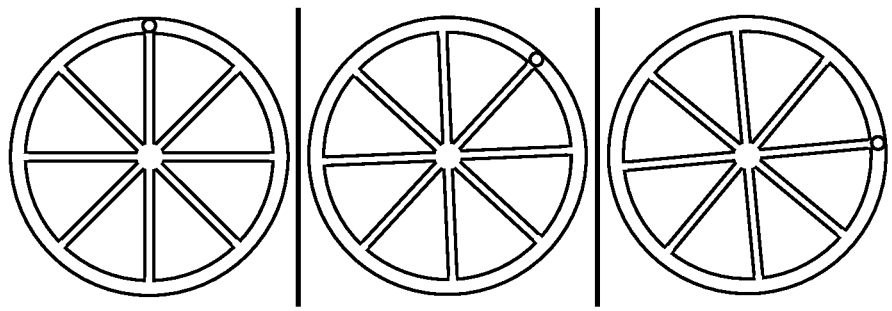
Figure 3:
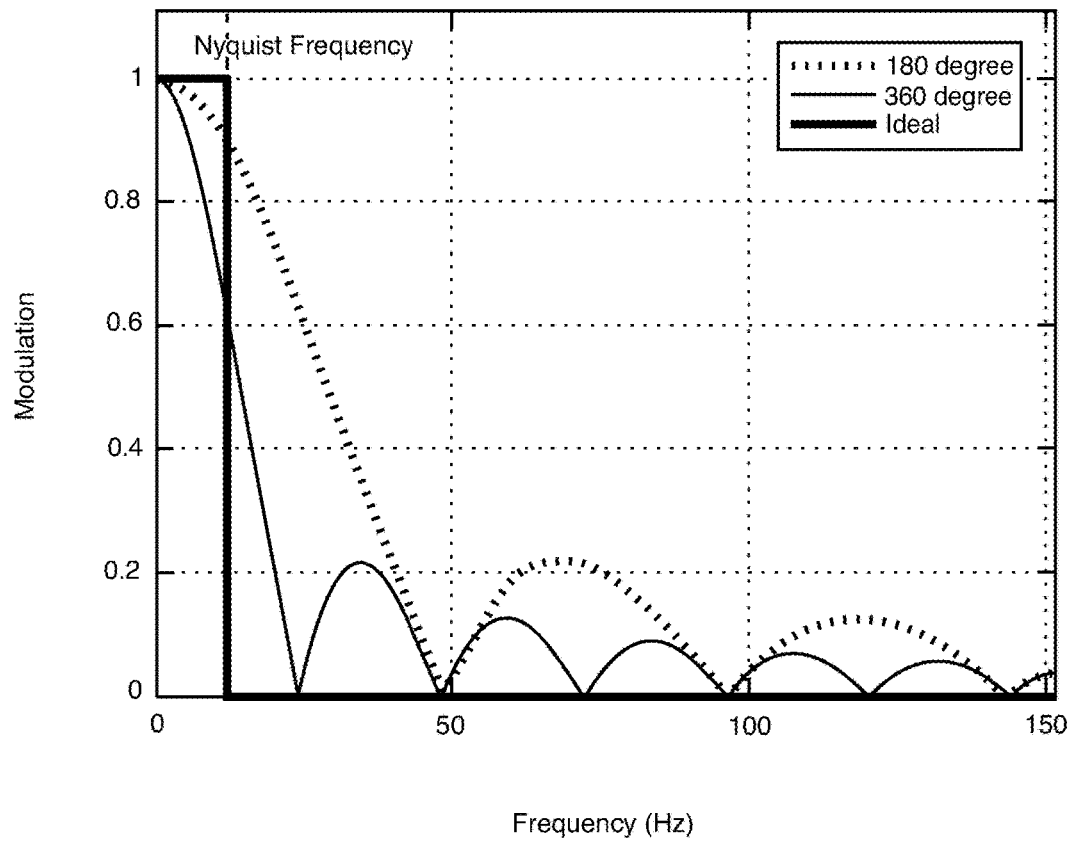
FIG. 3 is an illustration of modulation transfer functions for typical motion picture cameras.
Figure 4:
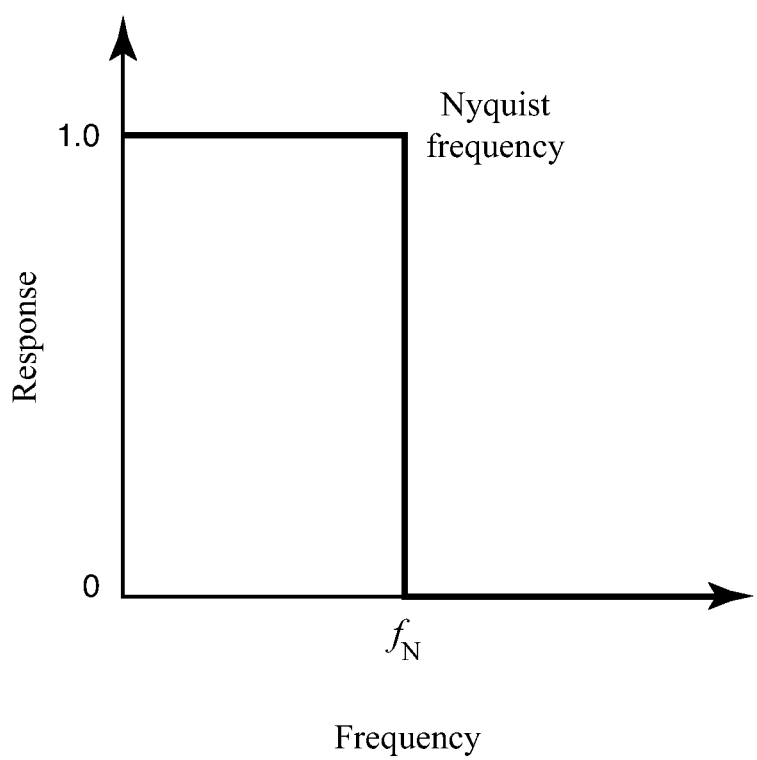
FIG. 4 is an illustration of an ideal prefilter modulation transfer function.
Figure 5:
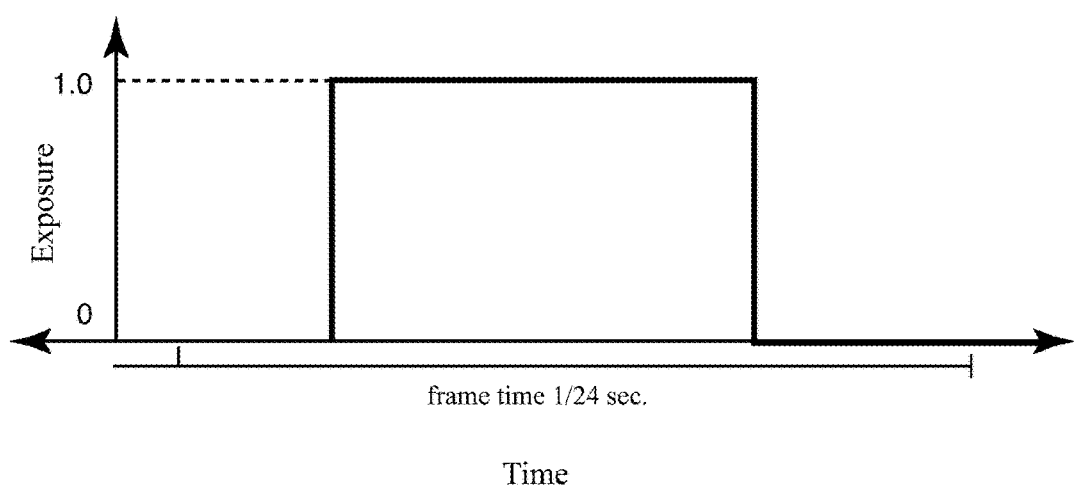
FIG. 5 is a plot of an exposure window function.
Figure 6:
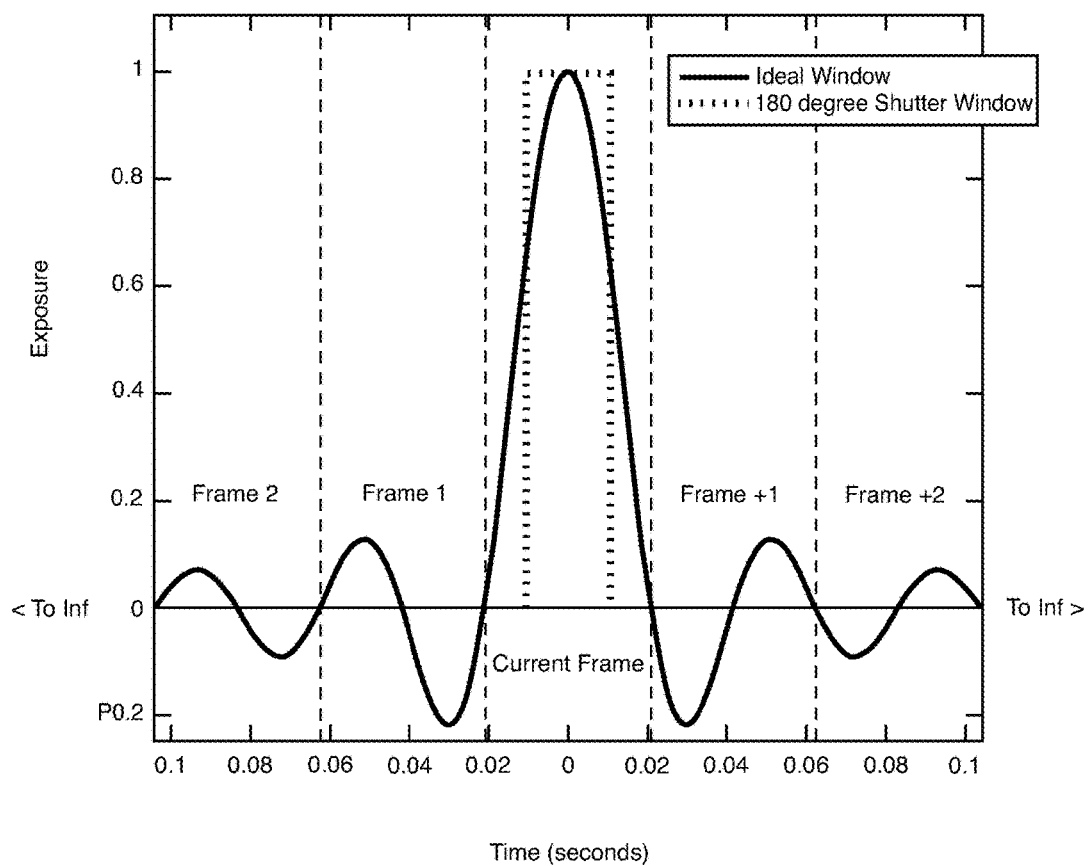
FIG. 6 is a plot of exposure vs. time of an ideal exposure window function and that of an exposure window function created by a semi-circular shutter.
Figure 7A:
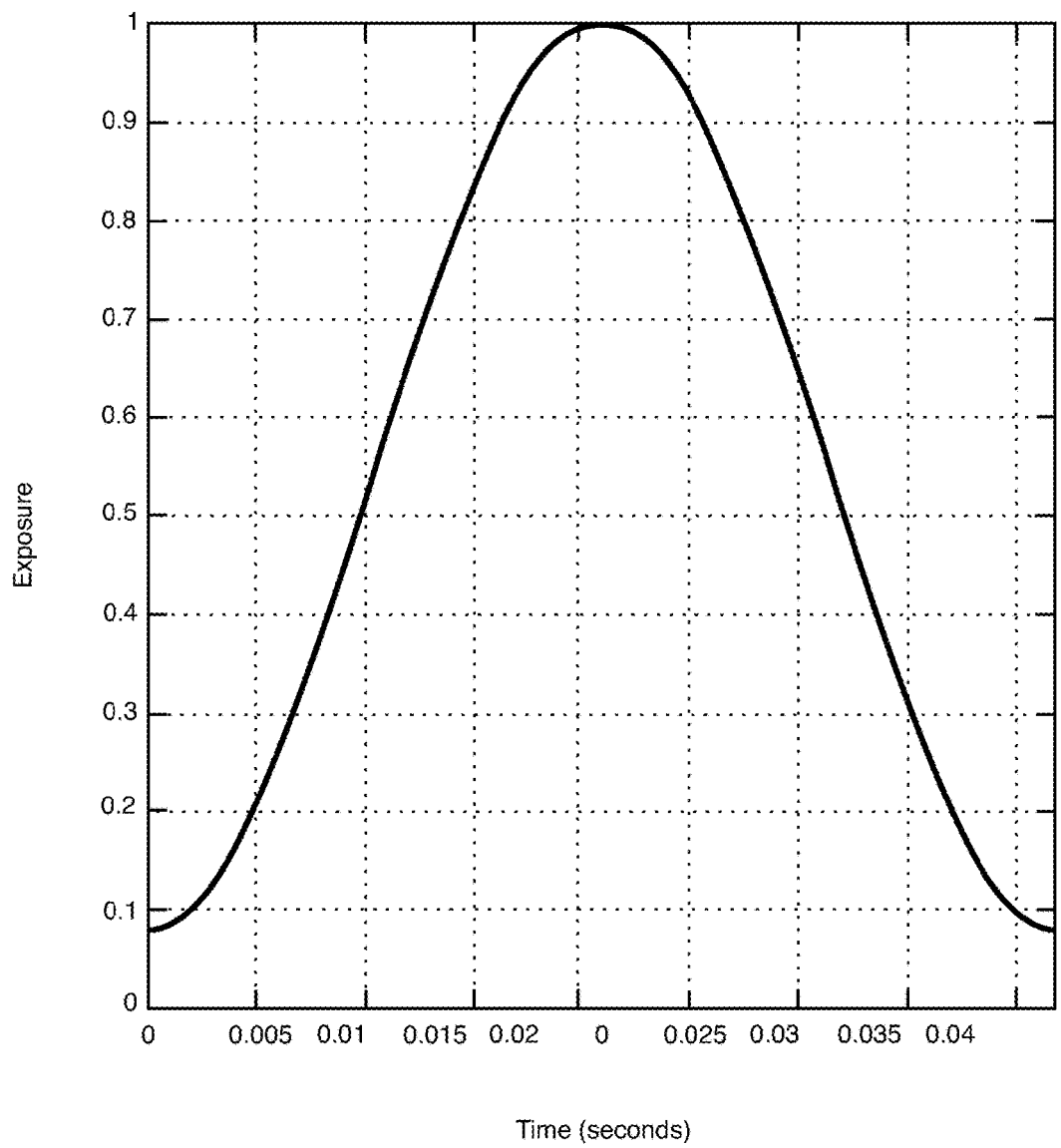
FIG. 7A is a plot of the exposure window function over a single frame.
Figure 7B:
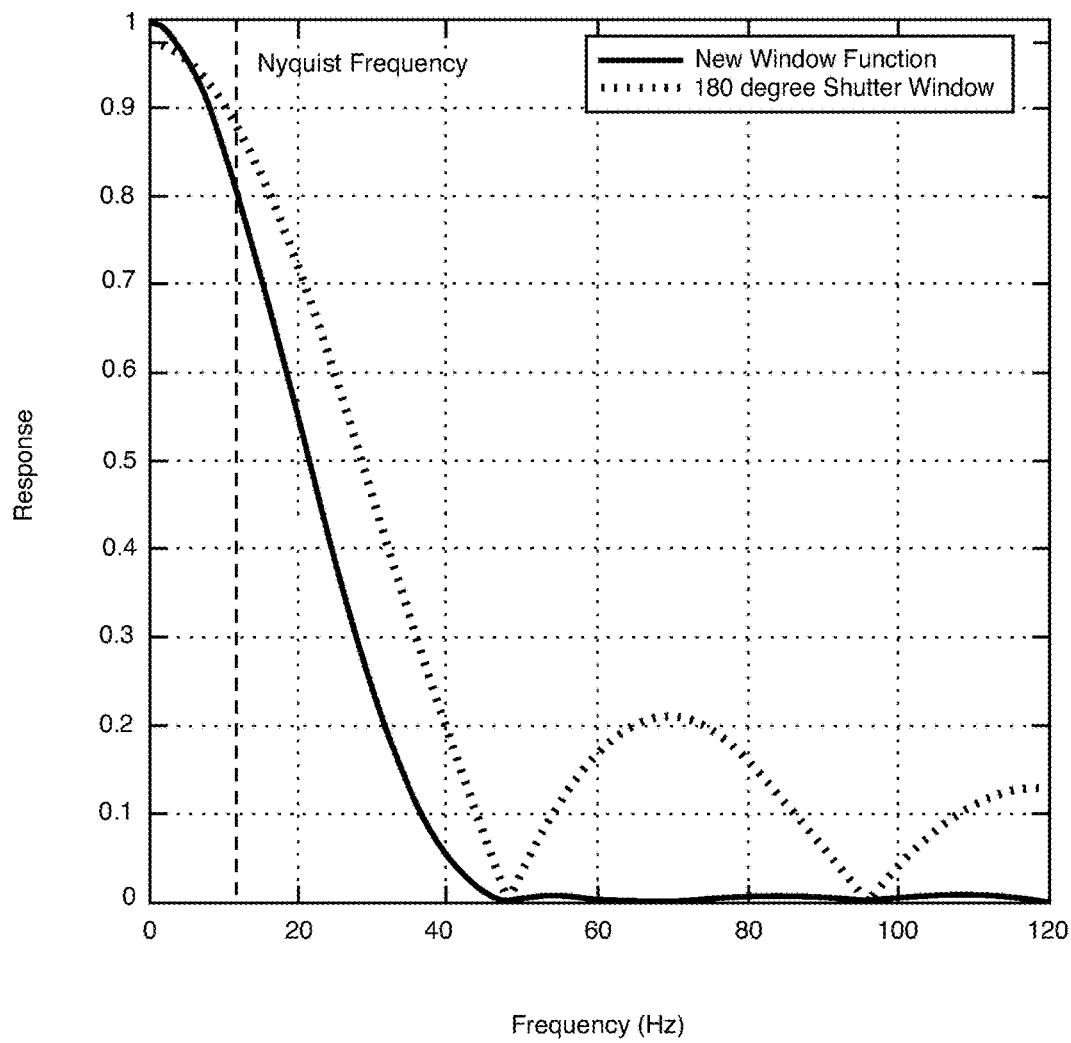
FIG. 7B is a plot of the modulation transfer function for an exposure window function.

FIG. 7 illustrates an exposure window resulting from the all embodiments of the present invention and the resulting MTF compared to the MTF resulting from a 180-degree shutter. FIG. 7A is a plot of the exposure window function over a single frame at a shutter speed of 24 fps. FIG. 7B is a plot of the modulation transfer function for the exposure window of all embodiments of the present invention illustrated in FIG. 7A. The resulting MTF has substantially less response above the Nyquist frequency, but a slightly reduced response below Nyquist when compared with the MTF of a typical 180 degree shutter, also shown in FIG. 7B.

Another embodiment of the present invention comprises a postfiltering apparatus that improves the system's response to frequencies below the Nyquist frequency, also called the baseband response. It is desirable to have the frequencies below Nyquist represented as fully as possible, ideally at a response of 1.0. The postfiltering apparatus adjusts reductions in the response in the region below the Nyquist frequency.

The postfiltering apparatus comprises a digital finite impulse response (FIR) convolutional filter. The FIR filter is a one-dimensional filter in the time dimension, so for every pixel of a particular frame, the value for that pixel is replaced by the weighted sum of values from that same pixel in the current frame as well as previous and subsequent frames. The number of frames used for the weighted sum is determined by the order of the filter i.e. how many elements are in the kernel. When a three element kernel is used, with values of [−1,41,−1], for every pixel in a frame, the pixel value is multiplied by 41, then the values of that pixel previous and subsequent frames are subtracted from that value. Finally, the value is divided by 39 (the sum of the three elements in the kernel) to normalize the sum. Higher order (length) kernels are employed to tune or obrtain different frequency responses.

Figure 8:
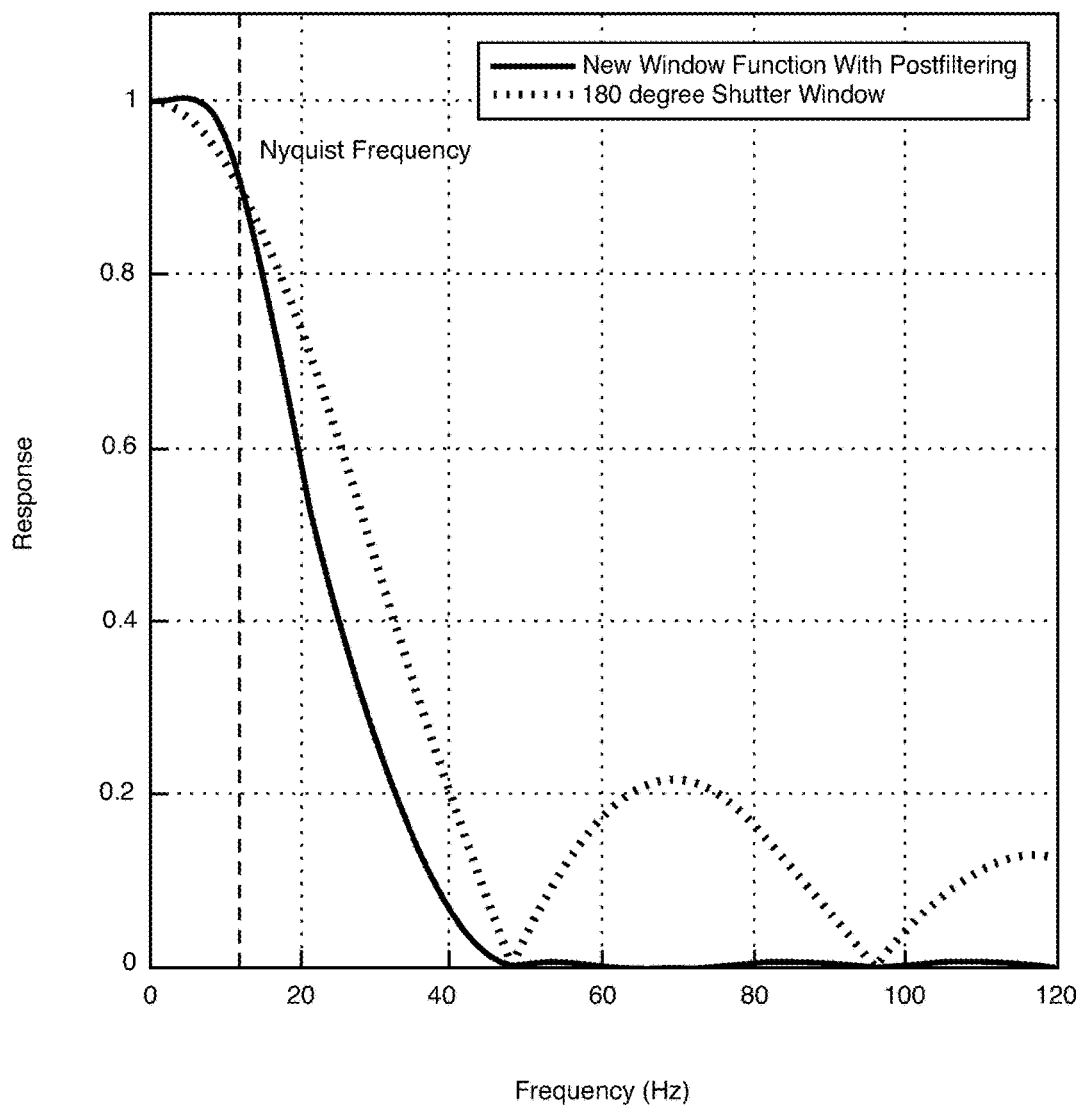
FIG. 8 is a plot of the modulation transfer function for an exposure window function with postfiltering and prefiltering.

FIG. 8 is a plot of the MTF for an exposure window produced using postfiltering and illustrates the combined MTF of a prefilter and a postfilter. The combined MTF provides a response closer to 1.0, the desired response in this area at frequencies below the Nyquist frequency and reduced response at frequencies above the Nyquist frequency, compared with the MTF of a typical 180-degree shutter.

Figure 9:
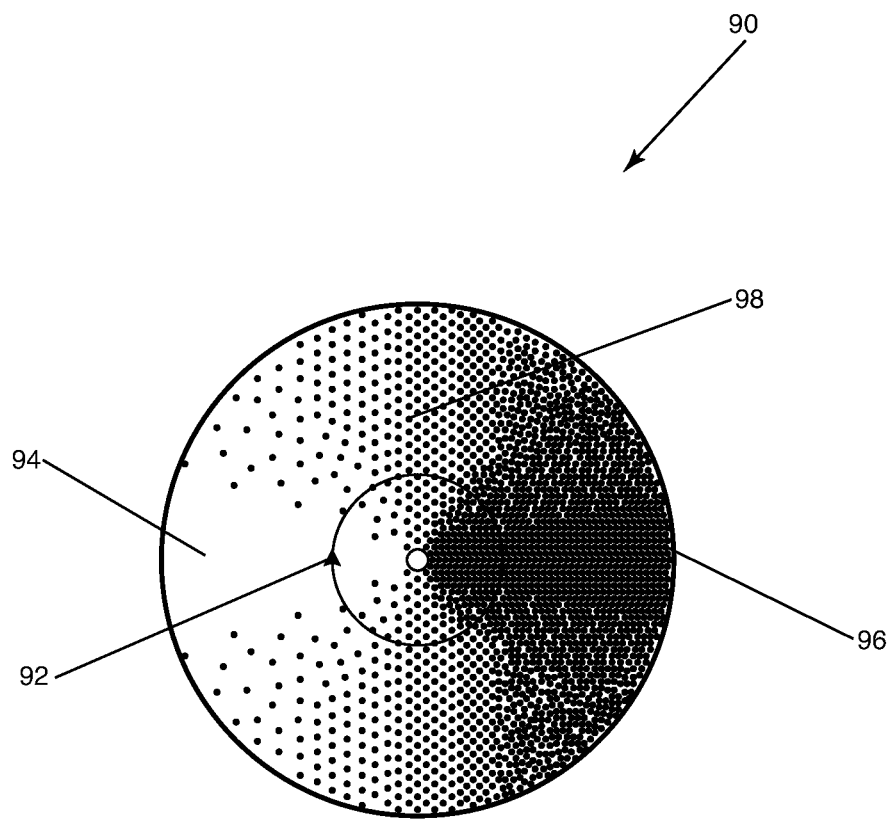
FIG. 9 is an illustration of a shutter comprising a continuously variable exposure effector comprising a perforated wafer as a method of producing variable exposure window functions of the present invention.

Another embodiment of the invention comprises a novel improved shutter comprising a wafer wherein perforations, preferably micro-perforations, are disposed in a locally random pattern and extending through the thickness of the wafer. The wafer comprises a shape including but not limited to a disk, a rectangle, a circle, an oval, or any other functional shape. The shutter comprises an exposure control apparatus, or an exposure window function generator. The shutter comprises a continuously variable exposure effector. The shutter enables the illumination captured on film or by a sensor to be varied. FIG. 9 illustrates shutter wafer 90 comprising a perforated micropattern (not shown to scale). The average density of perforations is adjustably distributed along path 92 producing a plurality of average opacities, thus creating any desired exposure window, in order words, creating a global average desired exposure window function.

A desired exposure window is created by disposing rotatable shutter wafer 90 adjacent to a lens or alternately near a sensor in a digital camera. The shutter wafer is rotated. The rotation is synchronized with the rate of frame acquisition of the camera. Wafer 90 continues to rotate so that area 94 rotates toward the vector of illumination. The illumination is blocked progressively less as the density of perforations becomes progressively greater. When area 98 is disposed directly adjacent to the illumination, more light is able to pass through to the sensor than is passed through at area 94. As shutter wafer 90 continues rotating and area 96 is rotated toward the vector of illumination, the illumination is blocked even less. When area 96 is disposed directly adjacent to the illumination, the perforations are so dense that the wafer is nearly transparent to illumination. Thus, a wide variety of exposure window functions over time are created by changing the average density of perforations in the wafer.

Figure 10:
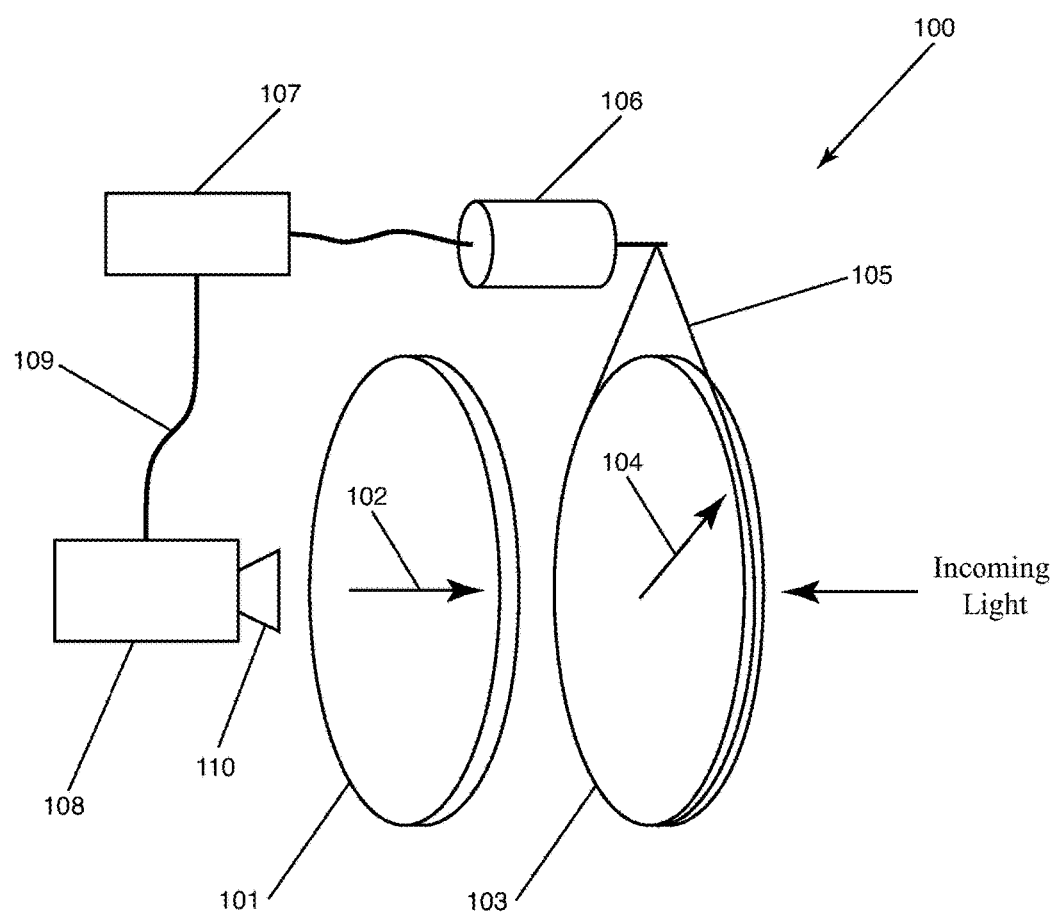
FIG. 10 is an illustration of twin polarizers, one stationary and one rotating, as another method of producing variable exposure window functions of the present invention.

Another embodiment of the present invention comprises an apparatus comprising two optical polarizers that continuously control illumination by rotating the polarizing filters, thus reducing or increasing illumination as desired. FIG. 10 illustrates system for frequency prefiltering 100 comprising polarizer 101 and polarizer 103 wherein the relative position of said polarizers control the delivery of illumination to sensor 108 as a function of time. Polarization direction of polarizer 101 is indicated by vector 102. Polarization direction of polarizer 103 is indicated by vector 104. Polarizer 101 is stationary, while polarizer 103 is rotated by electronic drive system 105 and drive motor 106.

An alternate embodiment of system for frequency prefiltering 100 comprises alternating the relative position of polarizers 101 and 103 by interchanging the polarizers and by disposing polarizers 101 and 103 closer to sensor 108 with no change to the effect on the system. Another configuration of system for frequency prefiltering 100 comprises disposing polarizers 101 and 103 between lens 110 and the film or digital sensor in camera 108. Electronic control box 107 controls electronic drive system 106 as desired. Synchronization cable 109 synchronizes electronic drive system 106 with sensor 108.

FIG. 7A is an exposure window function with exposure changing as a function of time over the duration of a single frame of exposure. An exposure window function such as in FIG. 7A is created by the prefilter of the present invention embodied in FIG. 10. When polarization direction vector 104 moves and aligns with fixed vector 102 additional illumination is allowed to reach sensor 108 and transparency is increased. When polarization direction vectors 102 and 104 are positioned perpendicular to each other, no illumination is allowed to strike sensor 108 and transparency approaches zero. Electronic control system 107 controls the rotation of polarizer 103 and provides a wide range of programmed exposure window functions by precisely controlling the angular speed of polarizer 103 during each acquired frame of sensor 108. This control allows exposure window functions such as the one illustrated in FIG. 7A to be produced.

Figure 11:
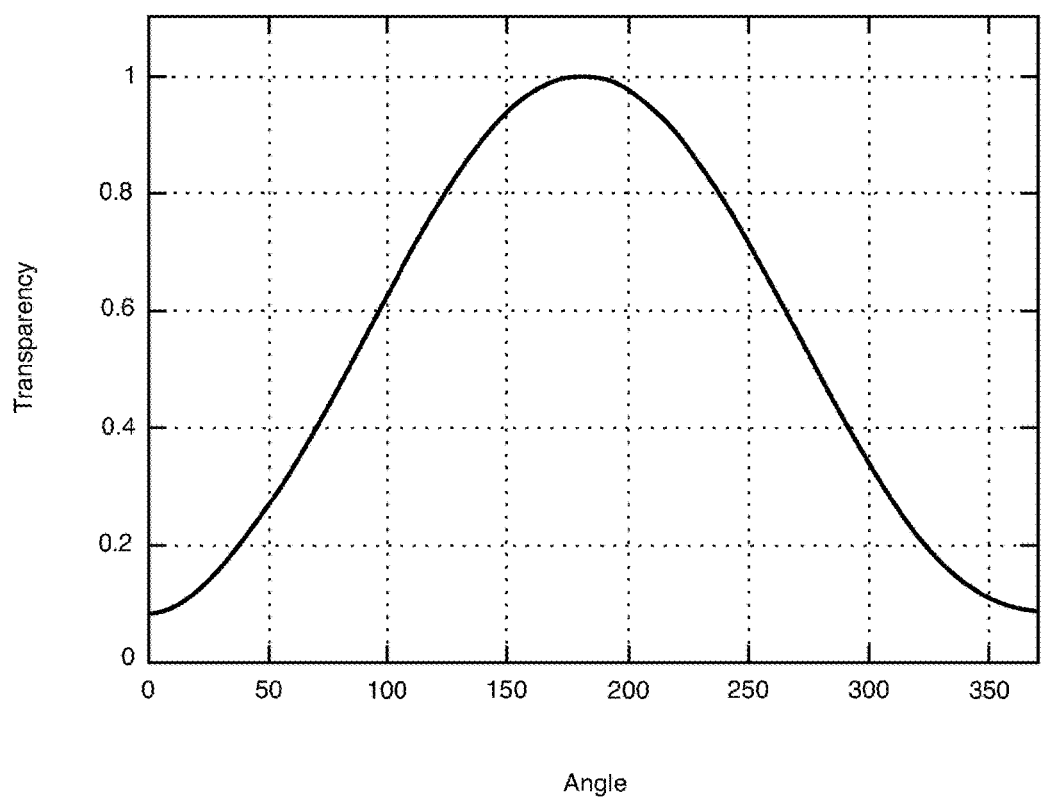
FIG. 11 is a transparency function for design and fabrication of exposure control wafers such as illustrated in FIGS. 9 and 13.
Figure 13:
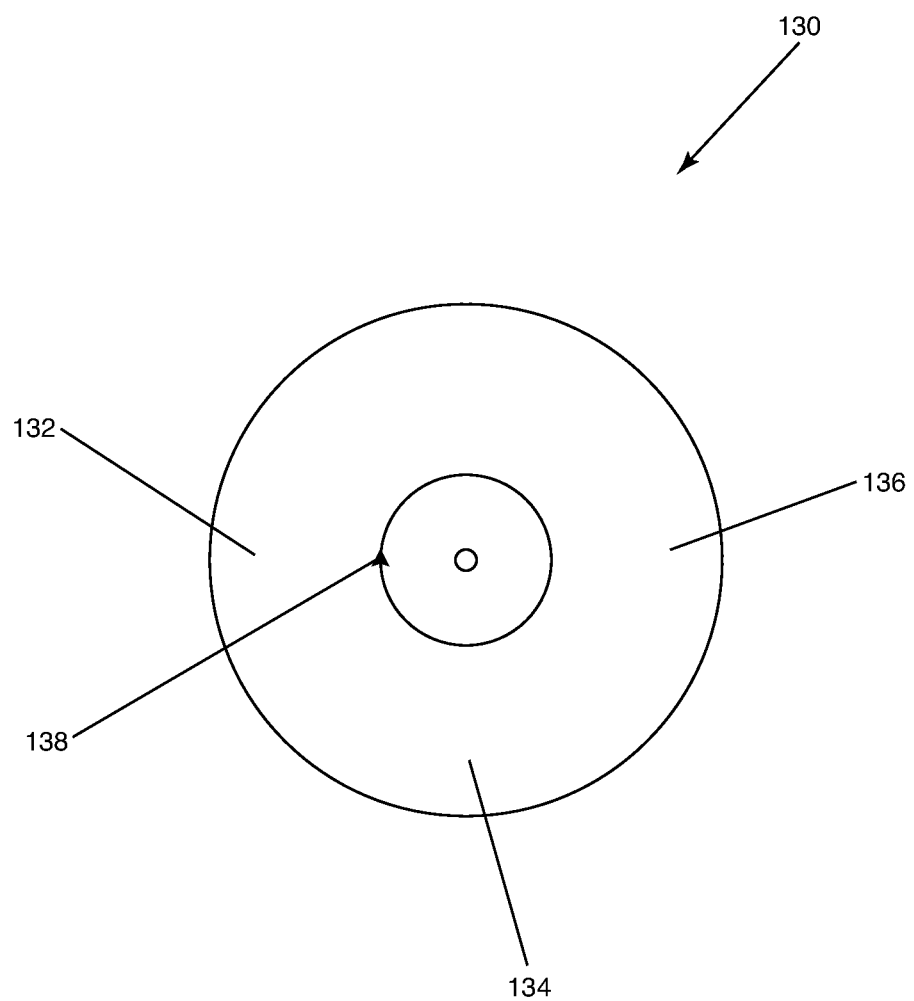
FIG. 13 is an illustration of a shutter comprising a continuously variable exposure effector comprising a graded neutral density wafer as a method of producing variable exposure window functions of the present invention.

FIG. 11 is a transparency function used to design exposure control wafer s such as those illustrated in FIGS. 9 and 13. A plurality of functions is used to create a plurality of exposure control wafers as desired.

Figure 12:
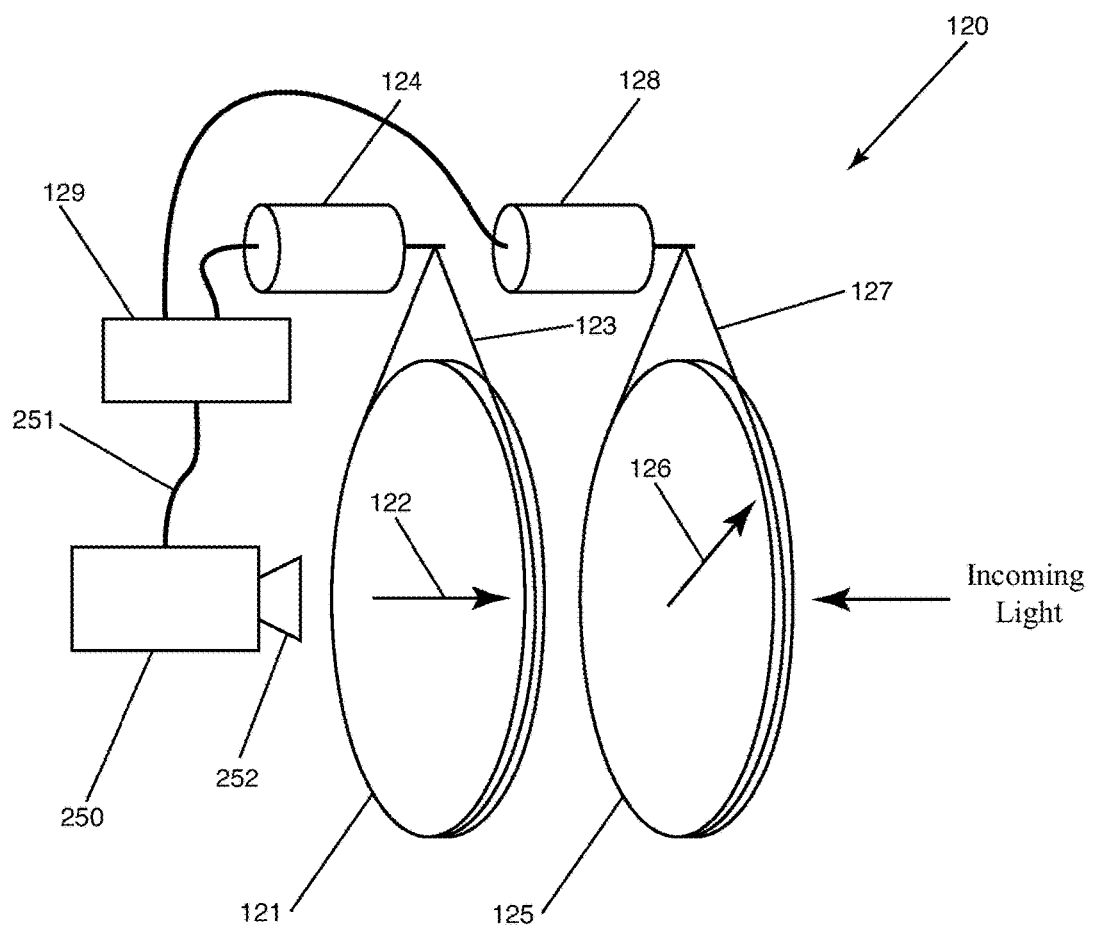
FIG. 12 is an illustration of twin polarizers, both rotating, as another method of producing variable exposure window functions of the present invention.

FIG. 12 illustrates system for frequency prefiltering 120 which is another embodiment of the present invention similar to system for frequency prefiltering 100 illustrated in FIG. 10. System for frequency prefiltering 120 comprises rotatable optical polarizer 121 and rotatable optical polarizer 125. Polarization direction of polarizer 121 is indicated by direction vector 122 and polarization direction of polarizer 125 is indicated by direction vector 126. Motor drive 128 and electronic drive system 127 power rotatable polarizer 125. Polarizer 125 rotates at least one half revolution during the exposure time of a single frame onto sensor 250 integrating all possible polarization angles of the incoming light onto the frame.

Polarizer 121 rotates at a rate different than the rotation rate of polarizer 125. Motor drive 124 and electronic drive system 123 power rotatable polarizer 121. Electronic control system 129 controls the relative rates of rotation of polarizer 121 and 125. Polarizer 121 accelerates and decelerates and produces any desired exposure window function. The exposure to sensor 250 is 0.0 when the directions of the polarization vectors 122 and 126 are perpendicular, and the exposure is at maximum when the directions of vectors 122 and 126 are parallel. Synchronization cable 251 controls synchronization of electronic control system 129 with sensor 250.

Depending on the sensor, synchronization signals are either generated by the electronic drive system to control the start of frame acquisition of the sensor or the sensor generates signals that indicate that frame acquisition has begun. The electronic control system receives these signals and properly synchronizes the motion with the sensor acquisition. The instantaneous relative angle of polarization directions 122 and 126 determines the instantaneous illumination of sensor 250. Thus, electronic drive system 129 is programmed to drive polarizers 121 and 125 to produce a plurality of exposure window functions, including the exposure window function illustrated in FIG. 7A.

FIG. 13 illustrates rotatable shutter wafer 130 of the present invention. Shutter 130 comprises a continuously variable exposure effector. Wafer 130 comprises a rigid material including but not limited to glass. Wafer 130 is comprised of a material comprising variable color-neutral opacity. One embodiment of wafer 130 comprises a transparent area located at or around area 132, an opaque area located at or around area 136, and a semi-transparent segment located at or around area 134. A path traced on the surface of wafer 130 produces a desired exposure window resulting from the variable transparency of wafer 130. One such path is indicated by circle 138, which provides the transparency function plotted in FIG. 11.

Figure 14:
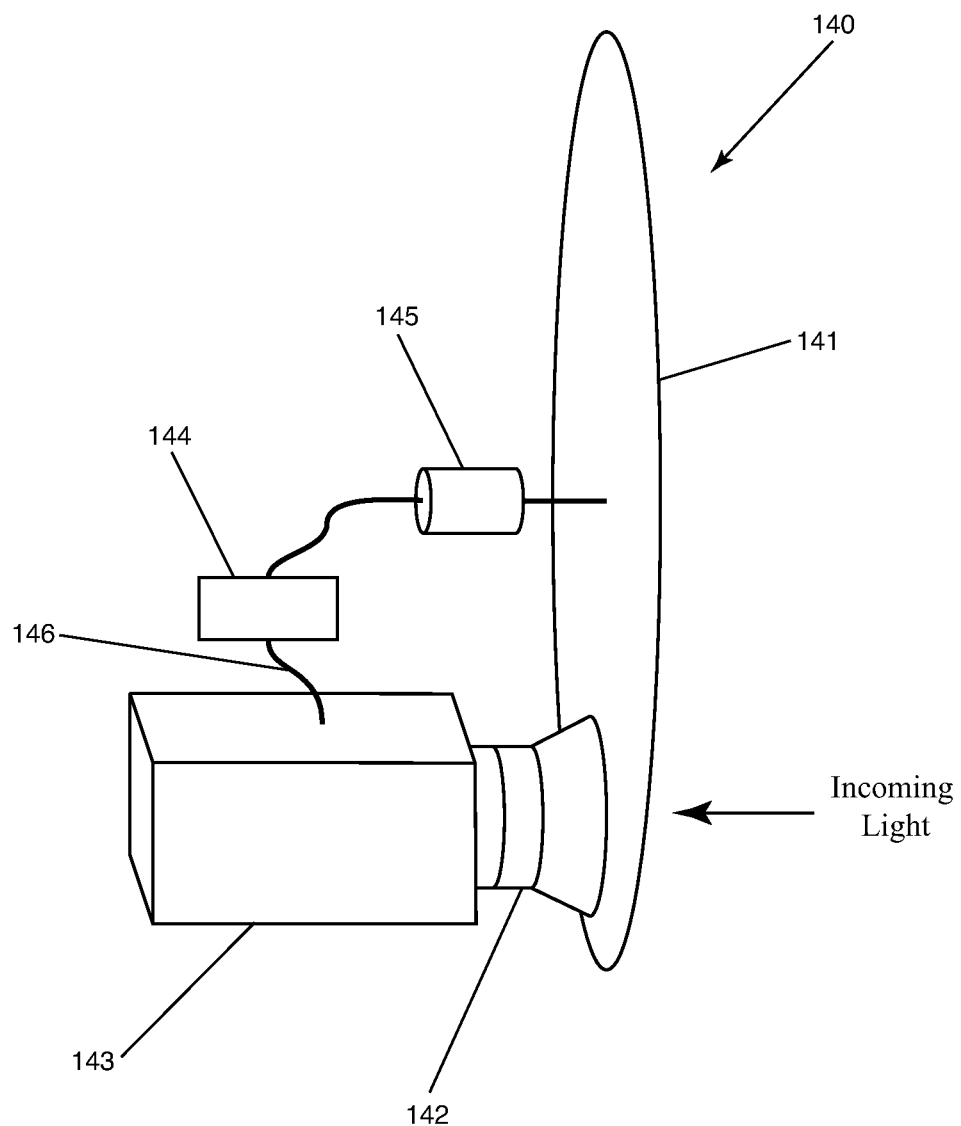
FIG. 14 is an illustration of an image sequence recording system with a rotating wafer capable of producing a variable exposure window function of the present invention attached.

FIG. 14 illustrates image sequence recording and sampling system 140 comprising rotatable exposure control wafer 141. Rotatable exposure control wafer 141 is disposed in front of lens 142. Exposure control wafer 141 comprises a wafer including the wafers illustrated in FIGS. 9 and 13 and the rotatable optical polarizers comprising wafers illustrated in FIGS. 10 and 12. Wafer 141 controls the exposure window during each frame exposure for either still or motion picture cameras. Incoming light passes through spinning wafer 141. The intensity of the light entering into lens 142 and on to camera 143 is varied according to the type of wafer used, as described previously. Electronic drive system 144 controls motor drive 145, which powers rotatable exposure control wafer 141. Synchronization cable 146 is attachably disposed between camera 143 and electronic drive system 144 and synchronizes the position of wafer 141 with the camera exposure.

The rotation of wafer 141 over the course of the frame acquisition of the camera 143 changes the amount of light over time, and therefore produces a continuously varying exposure window function as desired, such as the one plotted in FIG. 7A.

Figure 15:
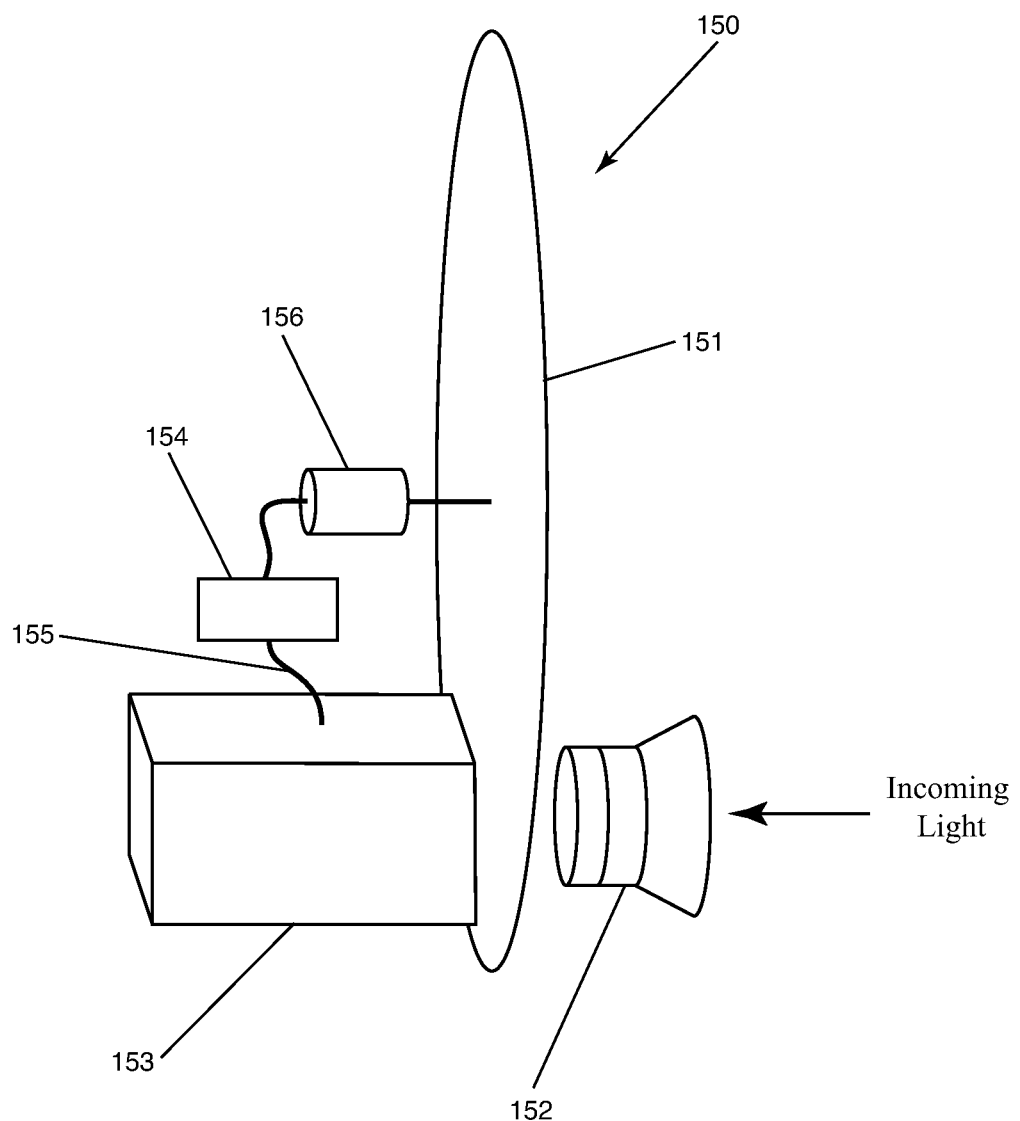
FIG. 15 is an illustration of an alternate embodiment of an imaging system with a rotating wafer capable of producing a variable exposure window function of the present invention attached.

FIG. 15 illustrates alternate embodiment imaging system 150. System 150 comprises exposure control wafer 151 disposed adjacent to lens 152, between lens 152 and sensor 153. Incoming light passes through rotating wafer 151. Exposure control wafer 151 comprises a wafer comprising the wafers illustrated in FIGS. 9 and 13 and the rotatable optical polarizers comprising wafers illustrated in FIGS. 10 and 12, and controls the exposure window during each frame exposure for a still or motion picture camera. Exposure control wafer 151 variably changes the intensity of the light from lens 152 before the light enters sensor 153. Electronic drive system 154 controls motor drive 156 which powers rotatable exposure control wafer 151. Synchronization cable 155 is attachably disposed between camera 153 and electronic drive system 154 and synchronizes wafer position with camera exposure.

The rotation of wafer 151 over the course of the frame acquisition of sensor 153 changes the light over a period of time, and therefore produces any of a plurality of continuously varying exposure window functions, such as the one plotted in FIG. 7A.

Figure 16A:
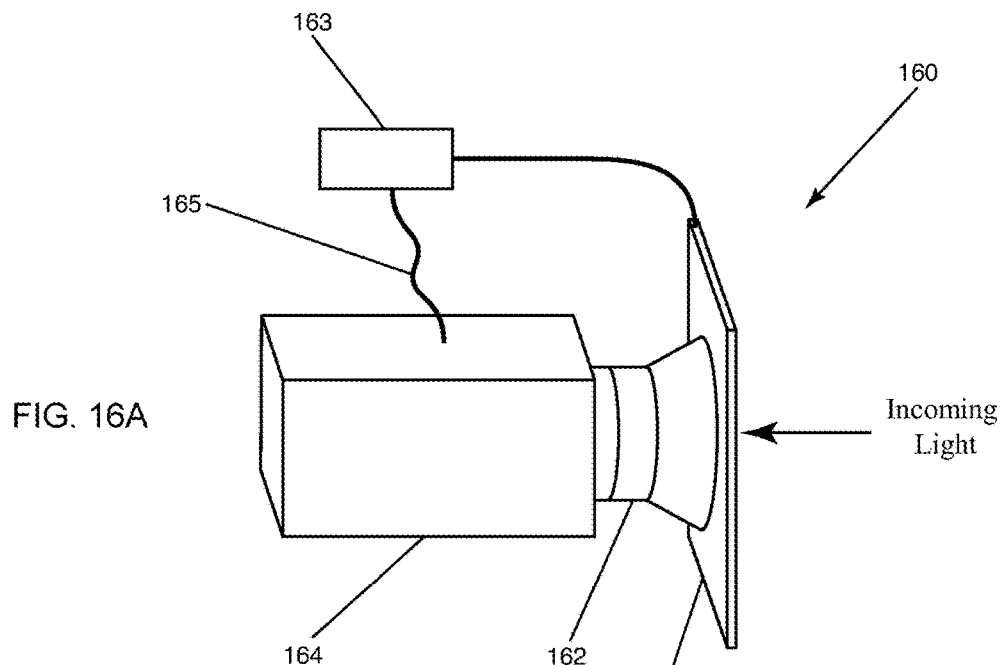
FIGS. 16A and 16B illustrate an alternate embodiment of an imaging system comprising a liquid crystal display (LCD) shutter to produce variable exposure window functions.

Another embodiment of the present invention comprises an apparatus comprising a liquid crystal display (LCD) shutter, as illustrated in FIG. 16. The shutter comprising liquid crystal 161 comprises a continuously variable exposure effector. FIG. 16A illustrates imaging system 160 comprising liquid crystal 161 comprising a plate for creating a time-varying exposure window function. The LCD shutter continuously controls the instantaneous illumination of the sensor over the course of a single exposure. System 160 comprises liquid crystal 161 disposed adjacent to lens 162 on the opposite side of liquid crystal 161 from the disposition of sensor 164. Sensor 164 comprises an optical sensor comprising film or alternately a digital sensor.

Liquid crystal 161 varies in opacity depending on drive voltage. The controlled liquid crystal 161 attenuates incoming light from the scene by variable amounts depending on the drive of electronic drive system 163. Synchronization cable 165 synchronizes electronic drive system 163 with camera 164. Liquid crystal 161 adjusts the light intensity and creates exposure window functions such as that plotted in FIG. 7A.

Figure 16B:
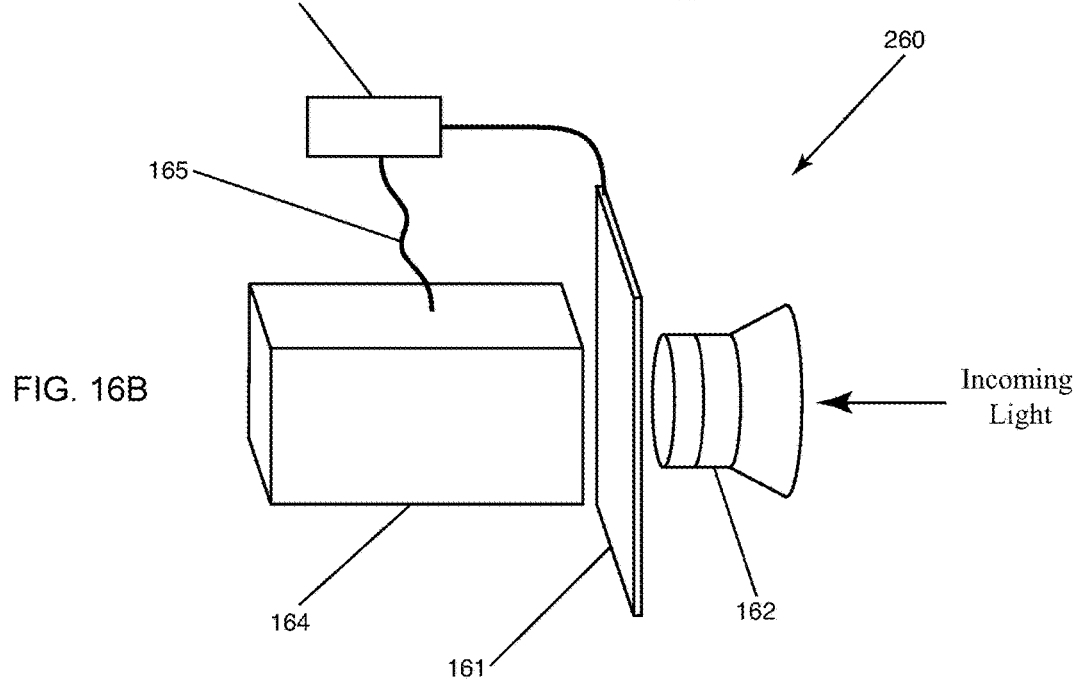

FIG. 16B illustrates alternate imaging system 260 comprising liquid crystal 161 disposed between lens 162 and film or digital sensor 164. Synchronization cable 165 synchronizes electronic drive system 163 with sensor 164. Depending on the sensor, synchronization signals are either generated by the electronic drive system to control the start of frame acquisition of the sensor, or the sensor generates signals that indicate that frame acquisition has begun. The electronic drive system receives these signals and properly synchronizes the motion via the motor drive with the sensor acquisition. In both of the previously described embodiments, the variable opacity characteristic of liquid crystal 161 controls the instantaneous illumination of the sensor. The electrically controlled opacity of liquid crystal 161 produces a wide variety of exposure window functions, such as the one plotted in FIG. 7A.

Figure 17:
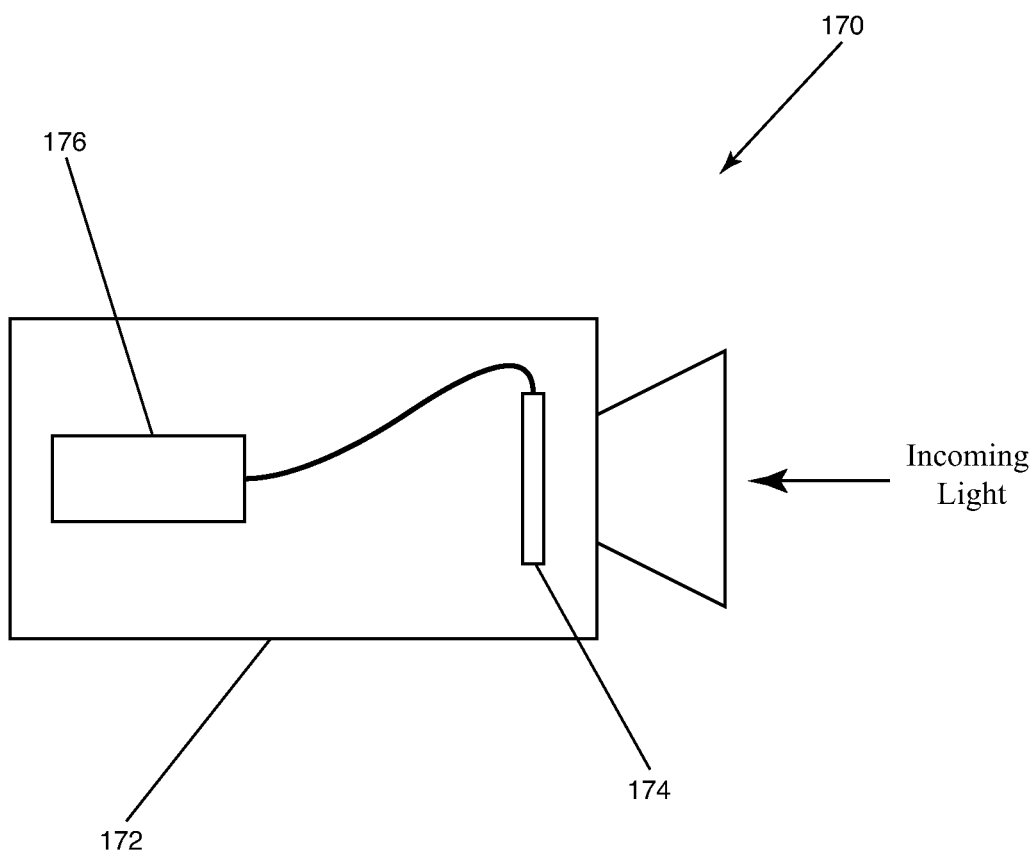
FIG. 17 is an illustration of the camera of the present invention comprising a digital sensor controlled to produce variable exposure window functions.

FIG. 17 illustrates another embodiment comprising system 170 comprising camera 172, digital sensor 174 disposed inside camera 172, and electronic drive system 176. The electronic shutter of image sensor 174 is directly modulated to achieve a desired exposure window function. Digital sensor 174 comprises a CCD or CMOS sensor that senses incoming light. Electronic drive system 176 generates an electronic control signal. Sensor 174 senses incoming light that is sensed by the proportion to the control signal generated by electronic drive system 176.

Digital sensor 174 comprises a CCD or CMOS sensor designed with direct electrical control of the power to the photodiodes comprising an "electronic shutter," or "bias line control." When the bias (or power) to each pixel's photodiode is removed, the pixel is no longer sensitive to light. When power is applied, the pixel becomes sensitive to light. Electronic drive system 176 drives the bias line of the sensor rapidly to approximate an analog change in gain of the pixel. When the bias line, during the course of a single frame of exposure, is rapidly switched on and off, and the ratio of on time to off time is varied over the course of that exposure, an exposure window function of any desired shape is produced during the single frame exposure time. The drive from the control system thus varies and modulates sensitivity in the sensor. FIG. 7A illustrates a possible generated exposure window function resulting from system 170.

Figure 18:
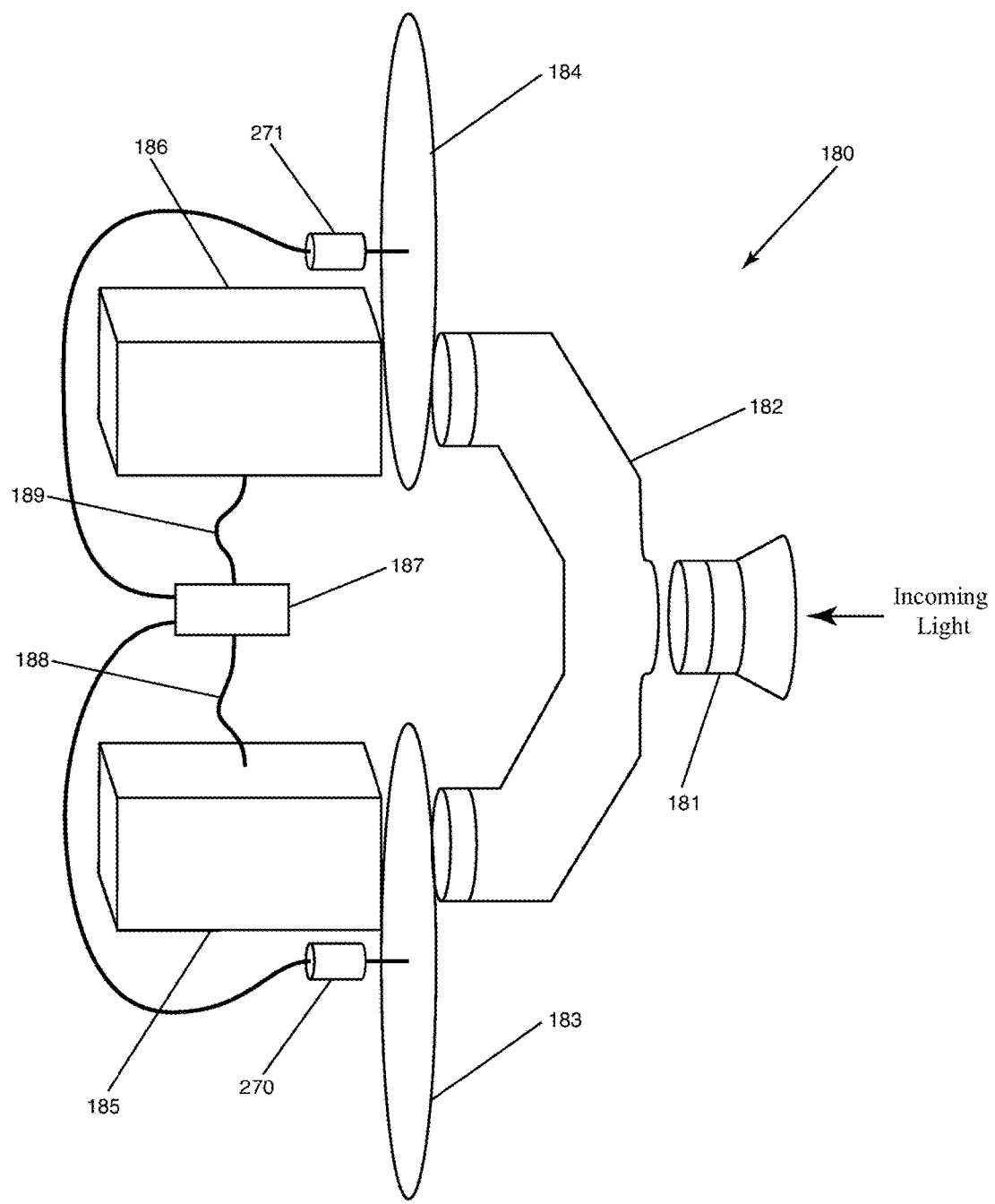
FIG. 18 is an illustration of a two-camera system comprising a temporal aliasing reduction system employing wafers that produce variable exposure window functions.

FIG. 18 illustrates two-camera system 180 comprising a temporal aliasing reduction system. Wafers 184 and 183 comprise any one of the wafer embodiments illustrated in FIG. 9 or 13 or the rotatable optical polarizers illustrated in FIGS. 10 and 12. Wafers 184 and 183 comprise rotating exposure control wafers and provide instantaneous exposure to sensors 185 and 186. Sensors 185 and 186 comprise optical sensors, not limited to film or digital sensors. Incoming light enters lens 181. Image splitter 182 splits the image. A controller controls the rotation of exposure window function wafer 183 so the exposure window function described upon it, or set by the relative positions of polarization angles, is 180 degrees out of phase with the function on exposure window wafer 184. Synchronization cables 188 and 189 attach and synchronize motion drive controller 187 to sensor systems 185 and 186. Controller 187 drives wafers 183 and 184 via motor drives 270 and 271.

This method of frequency prefiltering comprises connecting the sensor to the electronic signal generator via at least one additional synchronization cable, disposing an image splitter, operating two sensors and two exposure control effectors simultaneously, operating two sensors and exposure control effectors 180 degrees out of phase with one another; and interleaving the image sequences from the two sensors to create a single resulting sequence with desired frequency response.

The two-camera system achieves a longer effective exposure window function than a single camera achieves. Each camera samples and acquires images and image sequences at half the rate that a single camera acquires. The frames from the two cameras are combined to create final continuous footage. Each camera runs at 12 frames per second, with a result that system 180 as a whole achieves 24 frames per second effective capture. The frames from each sensor are alternately played back to create the final footage. Alternatively, the cameras run at higher rates, and prior-art digital downsampling filters are employed to achieve improved effective modulation transfer functions.

Figure 19:
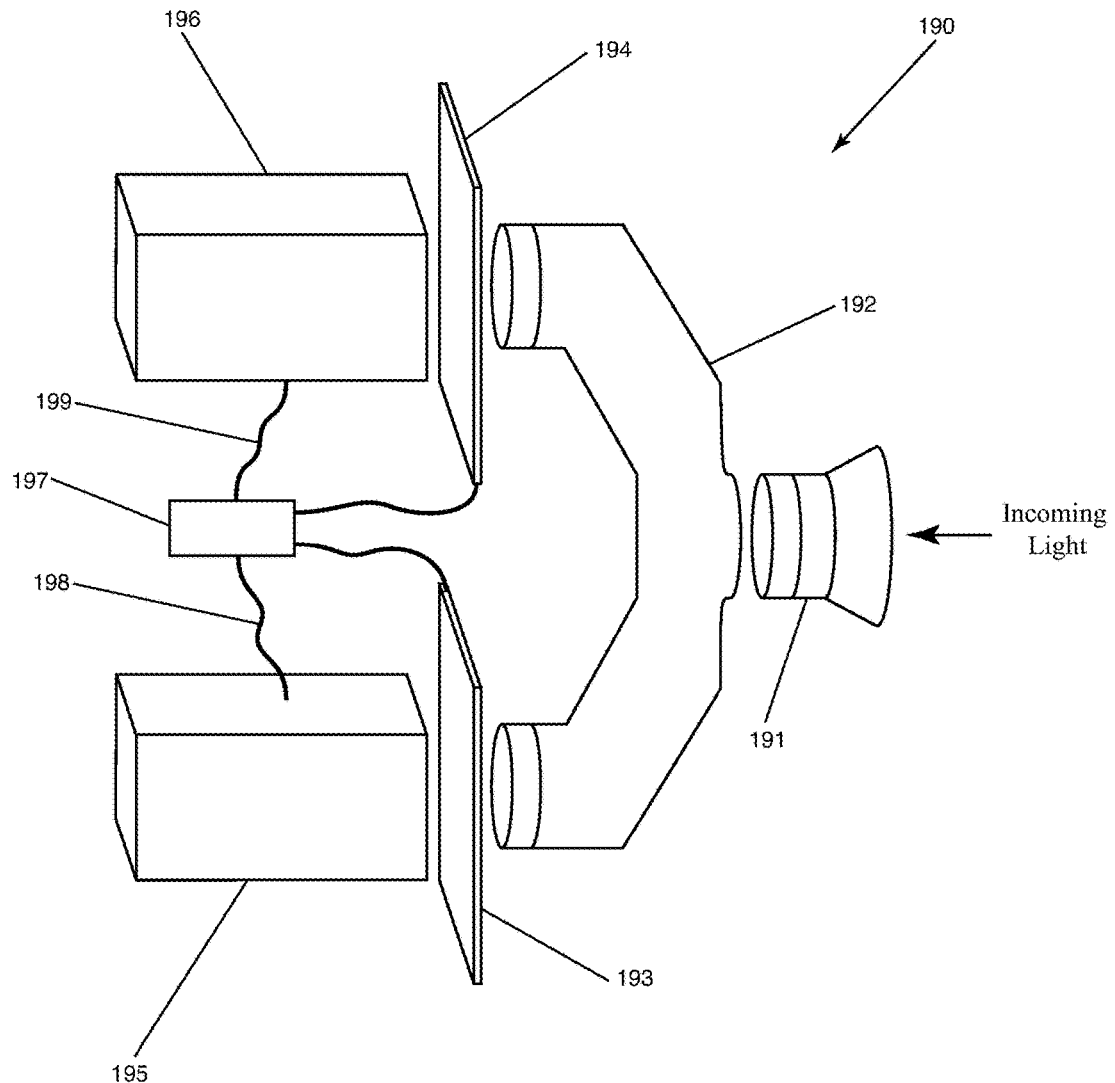
FIG. 19 is an illustration of a two-camera system for temporal aliasing reduction comprising liquid crystal panels that produce variable exposure window functions.

FIG. 19 illustrates two-camera system 190 for reducing aliasing comprising liquid crystals comprising panels 193 and 194. Liquid crystal panels 193 and 194 are similar to liquid crystal comprising plate 161 illustrated in FIG. 16. Liquid crystal panels 193 and 194 control the time exposure window function to each camera 195 and 196 in a similar way as does the embodiment illustrated in FIG. 16. Incoming light enters lens 191 and the image is split with image splitter 192. Liquid crystal panel 193 is controlled such that it has an exposure window function 180 degrees out of phase with the window function being created by the control of liquid crystal panel 194.

Synchronization cables 198 and 199 synchronize electronic drive controller 197 with both camera systems, and drive the liquid crystal panels. Two-camera system 190 achieves a longer effective exposure window function than a single camera can, and each camera acquires and samples images and image sequences at half the rate of a single camera. The frames from the two cameras are interleaved or combined to create the final continuous footage. Each camera runs at 12 frames per second to achieve 24 frames per second effective capture. The frames from each camera are alternated to create the final footage. Alternatively, the cameras run at higher rates, and more specialized digital filter functions are employed to achieve improved effective modulation transfer functions. The present invention thus comprises two cameras looking at the same image at the same time with alternating sampling and acquisition, and thus results in improved performance.

Figure 20:
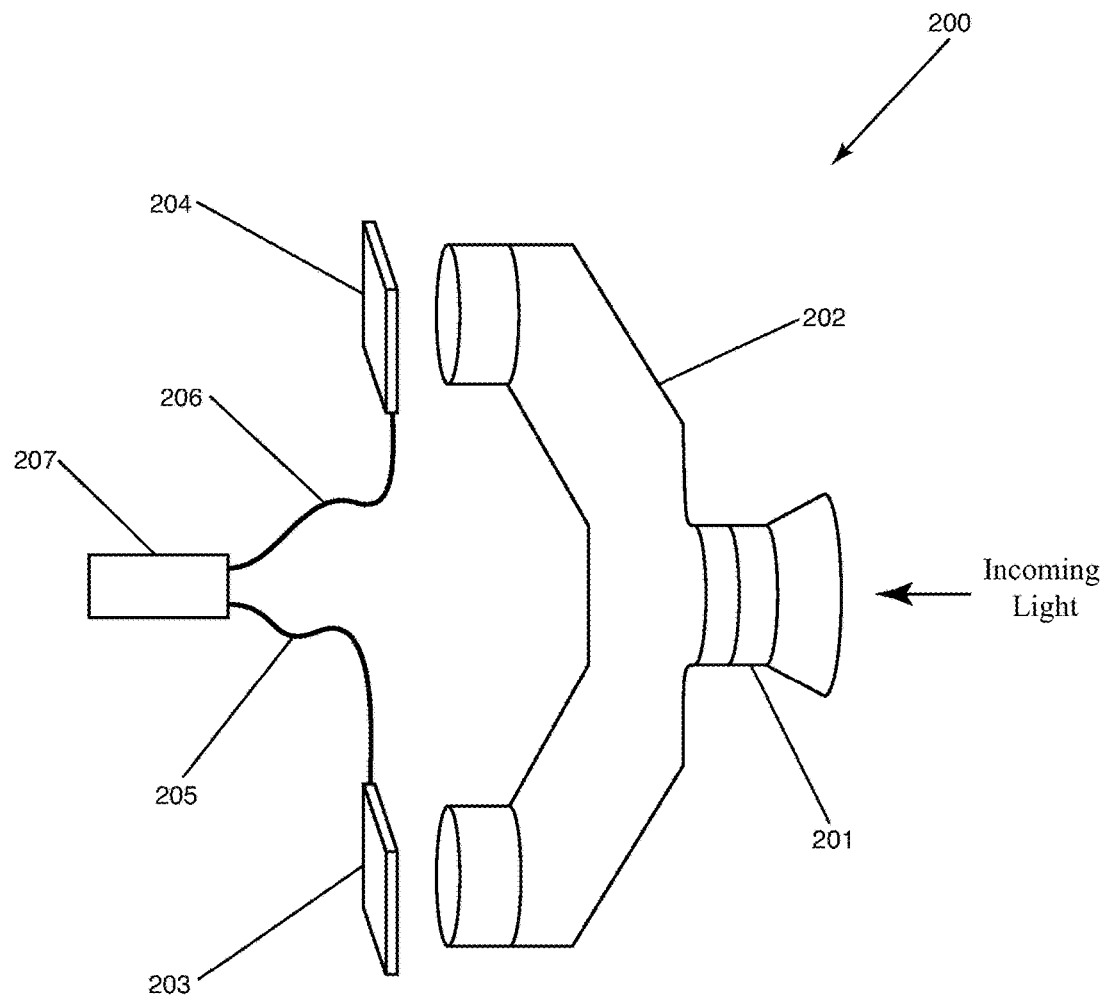
FIG. 20 is an illustration of a two-camera system for temporal aliasing reduction employing direct exposure sensitivity control of electronic image sensors such that variable exposure window functions are produced.

FIG. 20 illustrates two-camera system 200 employing direct exposure sensitivity control of electronic image sensors 203 and 204, similar to those illustrated in FIG. 17. System 200 controls the time exposure window in a similar way as the embodiment illustrated in FIG. 17 controls. Incoming light enters lens 201. Image splitter 202 splits the image. An exposure window function 180 degrees out of phase with the exposure window function of sensor 204 drives the exposure sensitivity of sensor 203. Electronic drive system 207 controls and modulates the acquisition time and exposure sensitivity of each sensor via synchronization cables 205 and 206.

The two-camera system achieves a longer effective exposure window function than a single camera does. Each camera acquires and samples images and image sequences at half the rate of a single camera. The frames from the two cameras are subsequently interleaved or combined to create final continuous footage. Each camera runs at 12 frames per second to achieve 24 frames per second effective capture. The frames from each are alternated to create the final footage. Alternatively, the cameras run at higher rates, and prior-art digital downsampling filters are employed to achieve improved effective modulation transfer functions.

Figure 21:
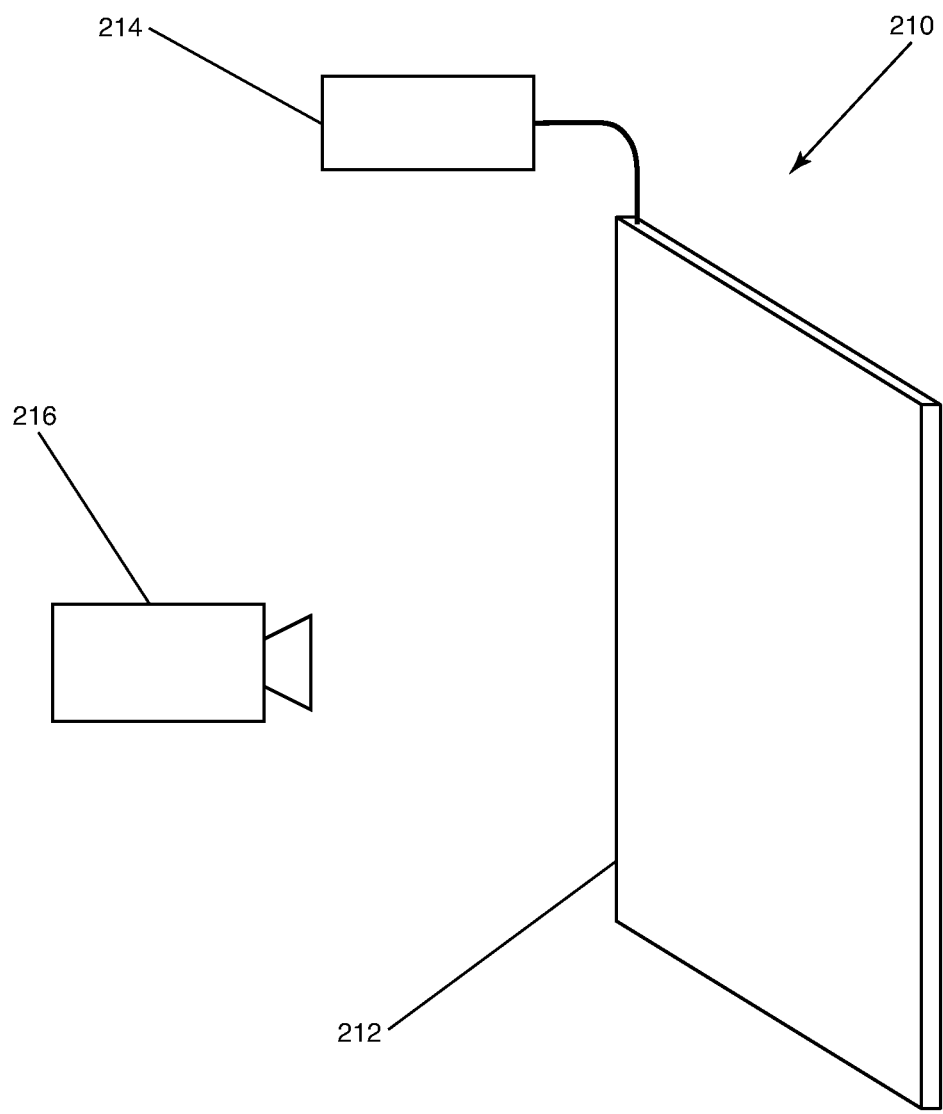
FIG. 21 illustrates a system for testing the temporal signal response of any camera.

FIG. 21 illustrates system 210 for testing the temporal signal response of any camera system with or without the embodiments listed herein. Control box 214 powers one or more light emitting diodes which illuminate light emitting diode panel 212. Control box 214 is unsynchronized with camera 216 being tested. Test LED panel 212 is disposed adjacent to camera 216 so that the panel fills the field of view of the camera. Control box 214 drives the light emitting diodes and sinusoidally varies the average illumination of panel 212. Over the course of a test, control box 214 varies the frequency of the sinusoidal light output of panel 212 in steps with indication signals in between each frequency. Analysis of the resulting data from the camera results in easily identifiable frequency steps.

For testing a typical camera for time domain frequency response, the frequency of the sinusoidal illumination of panel 212 is varied in 1 hertz increments from 1 hertz to 120 hertz, although higher frequencies may be produced. Starting at a frequency of 1 hertz, the LED panel is illuminated with a 1 hertz sinusoidal intensity for a duration of several (typically five) seconds. Then the frequency is increased to 2 hertz and held at that frequency for several seconds. This process is continued for all frequencies desired. The images and image sequences from the camera recording the entire illumination sequence are analyzed to determine the recorded frequency with respect to the illuminated frequency on panel 212, and the response (recorded amplitude of the sinusoid with respect to actual amplitude of panel 212) of the camera to each frequency is analyzed. To ensure linear response of the camera to illumination levels of 212, and to compensate for any nonlinear response, a linear sweep of amplitude of illumination of 212 is produced and recorded by the camera on film or digital storage.

A delay, or phase shift, between the externally or internally generated synchronization signal and the actual time of image sequencing and acquisition may exist in cameras currently used. This phase shift exists for many reasons, including an internal camera controller delay or the time delay caused by CMOS rolling shutters. The amount of this time shift often differs from camera to identical model of camera.

The phase shift inherent in a camera, if any, must be known in order to successfully synchronize a physical action occurring in the field of view of a motion picture camera with the exact time that an image is captured. This is required to synchronize any of the embodiments of an exposure window function generator contained therein to a camera system. Phase differences between synchronization signals and camera acuqisition which are not correctly compensated will cause incorrect alignment of the exposure window function generated and the exposure of the sensor or film.

Figure 25:
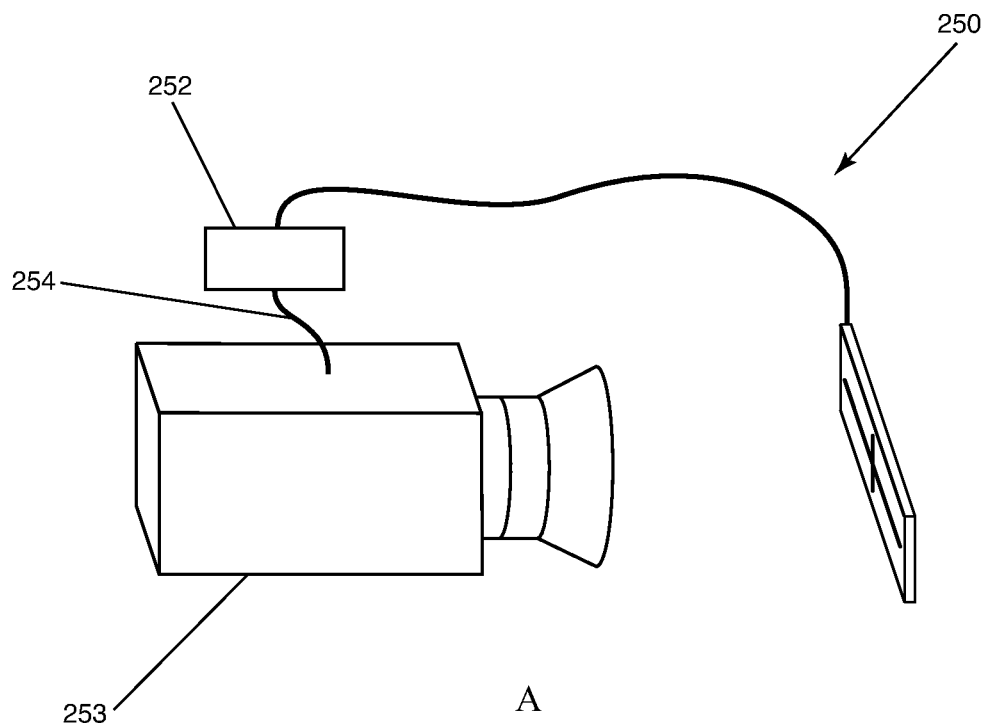
FIG. 25 illustrates a camera phase shift detection system.
Figure 25:
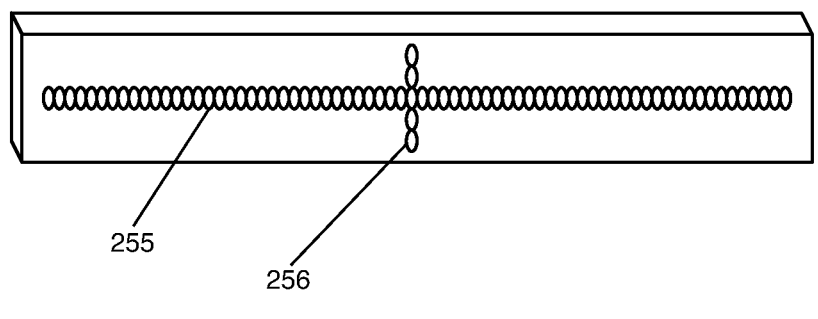

Another embodiment of the present invention comprises an apparatus and method to detect and synchronize phase shifts. FIG. 25 illustrates camera phase shift detection system 250 comprising sequence wand 251, control box 252, and camera 253. Control box 252 receives synchronization signal 253 via synchronization cable 254 and also controls sequence wand 251 based on the same synchronization signal. Sequence wand 251 comprises a plurality of visible electromechanical or electroluminescent indicators 255.

Additional lights 256 are always illuminated to indicate a centerline, or crosshair, to provide a goal position to the user during calibration. Plurality of visible electromechanical or electroluminescent indicators 255 are operated in a sequential fashion and complete one cycle every frame period.

One embodiment of the present invention comprises a plurality of visible electromechanical or electroluminescent indicators 255 comprising a plurality of light emitting diodes (LEDs). Control system 252 sequentially illuminates only one LED at a time of the plurality of LEDs, thus creating a scanning pattern from left to right (or vice-versa). The control illumination sequence commences at the instant a synchronization signal is received via synchronization cable 254.

Plurality of visible electromechanical or electroluminescent indicators 255 is disposed at a location in view of the motion picture camera. When the shutter time of the camera is set to a very narrow angle, that is, a very short exposure, only one of the LEDs will be illuminated during the time of the camera exposure. The inherent phase shift of the motion picture camera is determined by observing which of the LEDs is illuminated. When the camera sensor exposure start time and synchronization signal are exactly calibrated, the central LED is detected by the sensor during exposure. As the phase shift increases, other LEDs are visible and detected by the sensor. The correct phase offset is determined by the user adjusting the phase offset with control box 252 until the central LED is visible to and detected by the camera's sensor.

There is no currently available method or system for quantifying the phase of a motion picture camera, even though many methods and systems for synchronizing the frequency or frame rate of motion picture cameras currently exist. It is sometimes necessary to quantify the phase, or the inherent delay in the camera, from when a synchronization signal occurs to when a frame is actually captured, when motion picture cameras are used.

The system of the present invention comprises an array of lights that are turned on and off in a particular sequence during the course of a single frame. The timing and synchronization of the lights is based on the synchronization signal sent to and from the motion picture camera. The light array is held in the camera's field of view and the camera is configured to run with a very narrow shutter angle. When the camera captures an image, only some of the lights in the array will be illuminated. By knowing which lights are illuminated, the sequence in which the lights illuminate, and the period of the synchronization signal, the phase of the camera can be determined.

Figure 26:
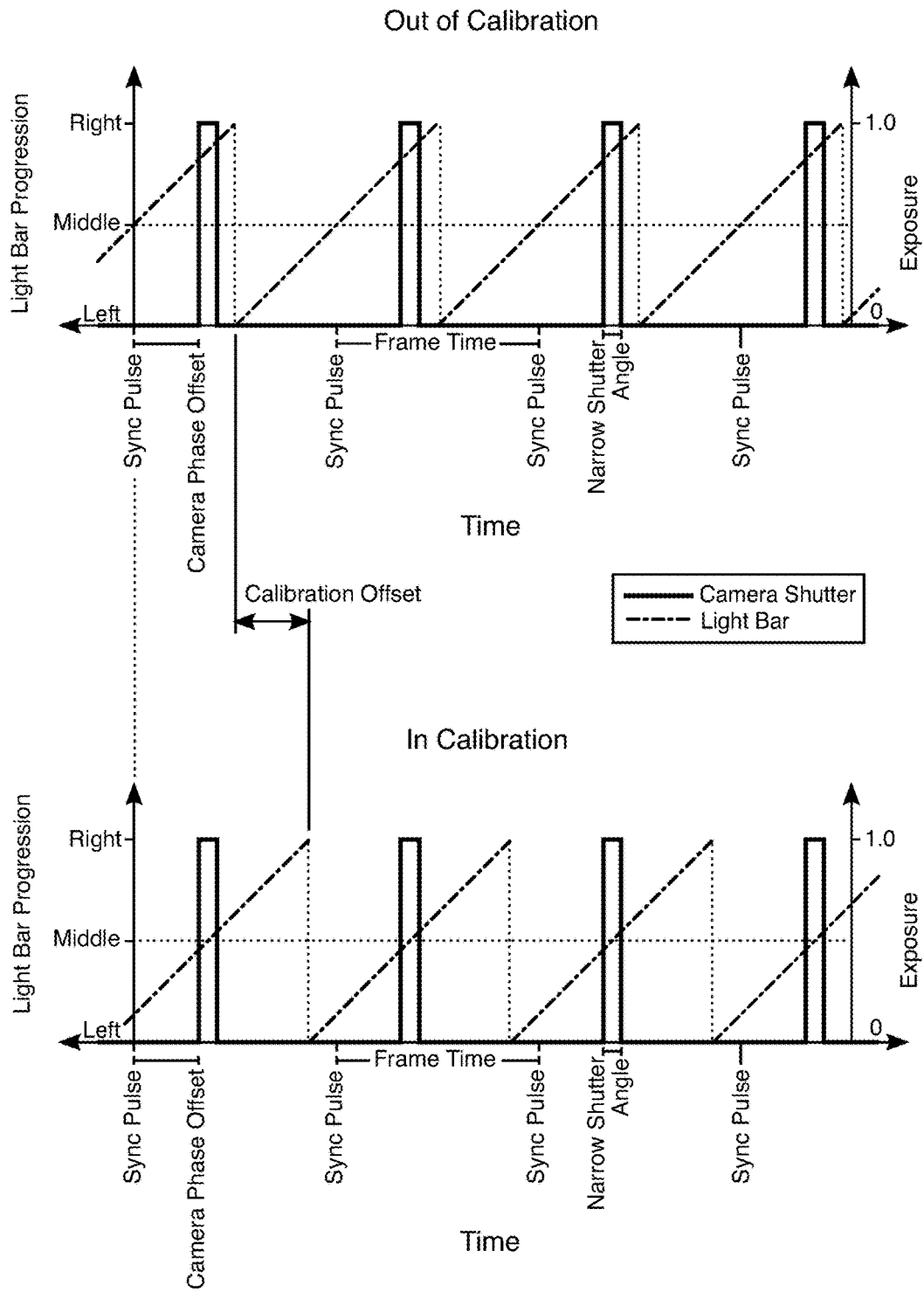
FIG. 26 shows plots of a light bar out of calibration and one in calibration.

FIG. 26 shows two plots, one depicting a camera and synchronization system where the phase offset between synchronization and camera exposure is very large, and one showing a system with no phase difference, that is, a system in which image sampling and acquisition and the synchronization signal occur simultaneously. The camera phase offset is unknown at the start of calibration and, in this example, results in the LEDs near the right end of plurality of visible electromechanical or electroluminescent indicators 255 being the only ones from which light is sensed during the image sampling and acquisition.

When the user uses control box 254 to shift the starting point, or phase shift, of the LED sequence relative to the synchronization pulse received on synchronization cable 254, the small section of LEDs which are illuminated during the short exposure of camera 253 appears to shift in the image sampled and acquired by the camera. This is adjusted until LEDs are illuminated at reference point 256. This calibration offset value of the time shift entered into the control box is equal to the inherent phase shift in the motion picture camera.

Another embodiment of the present invention comprises a system for automated variable neutral density filtering. A liquid crystal disposed in front of a camera lens is driven by an electronic control box with a symmetric square wave drive of variable amplitude and zero average voltage. The amplitude of the square wave causes the opacity of the liquid crystal to vary, with increasing amplitude causing increasing opacity. By adjusting the amplitude of the square wave voltage, the liquid crystal's opacity is precisely controlled to achieve a desired reduction in light to facilitate proper exposure.

Figure 27:
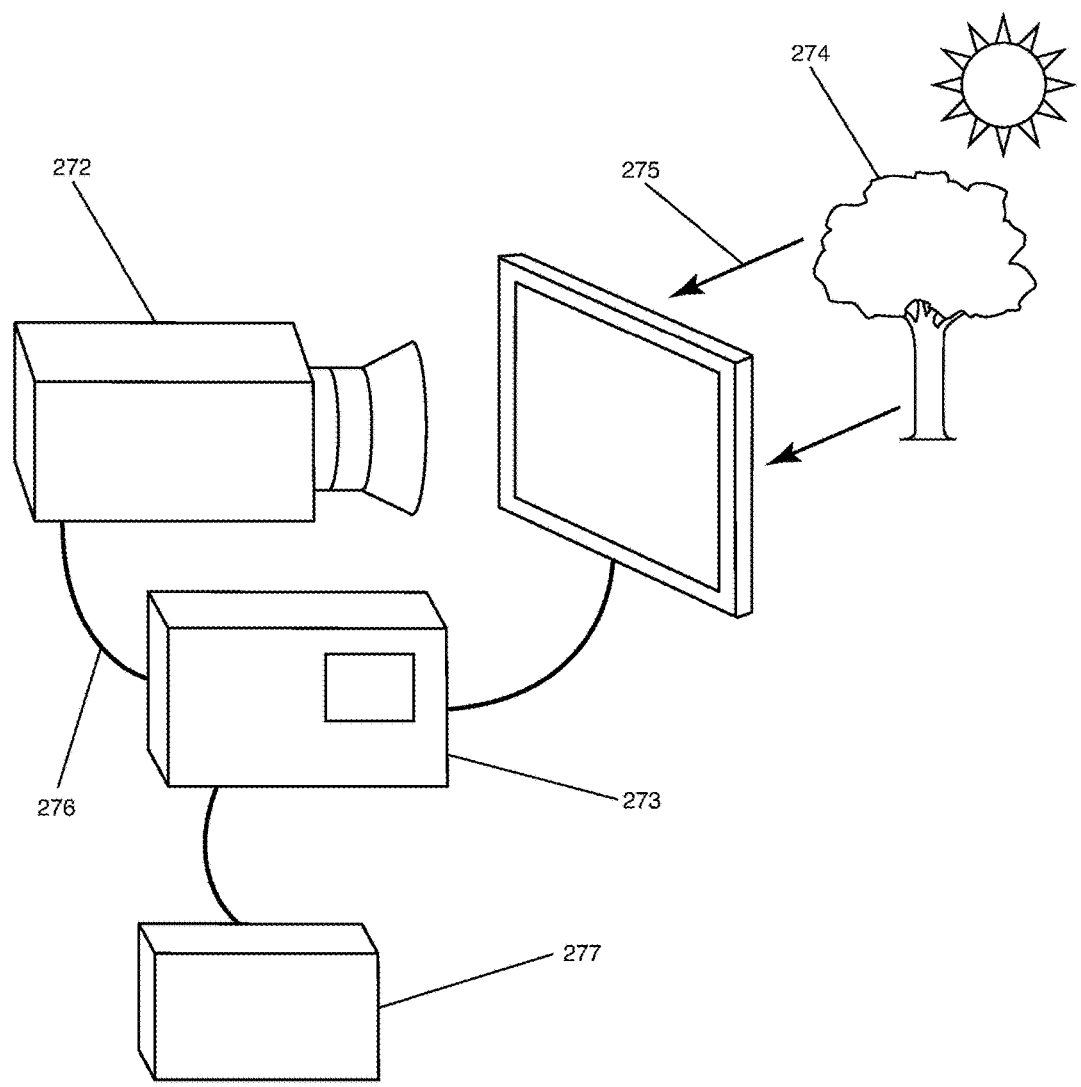
FIG. 27 illustrates a liquid crystal display (LCD) shutter.

FIG. 27 illustrates liquid crystal display (LCD) shutter 271 disposed in front of camera lens 272. Electronic control box 273 drives shutter 271 and precisely controls the liquid crystal's opacity to achieve desired reduction of incoming light 275 from scene 274 to facilitate proper exposure. Synchronization signals are accepted by control box 273 via synchronization cable 276. Overall control of the time-lapse sequence is directed by externally provided time-lapse controller 277, which indicates electronically to controller 273, via standard signal protocols, the desired exposure for a particular frame.

This opacity control is particularly beneficial in the field of time-lapse photography, especially time-lapse photography where the time between exposures is variable during the sequence of exposures. Often in this case, it is desirable to have the shutter exposure time be related to the time between exposures. For instance, if a 180-degree shutter angle is desired for the entire time-lapse sequence, then the exposure time for each frame would be exactly half the time between exposures, so if a picture is to be taken every second, the exposure time would therefore be one-half of a second.

In the case of a nonlinear time-lapse sequence, the time between exposures may be different during the course of the sequence. If the effective shutter angle is to remain constant while the time between exposures is changing, the absolute shutter exposure time will become longer or shorter for a particular frame of the sequence, which will result in overexposure or underexposure. Compensating with the lens aperture is undesirable, as it will shift the focus depth-of-field. The present invention consistently exposes each frame of the time lapse sequence by adjusting the liquid crystal's opacity and thus achieves the desired exposure for a given shutter speed and aperture.

The electronic control interface for the liquid crystal combines the actual drive electronics, a user interface for exposure control, and a computer interface for control by an external time-lapse control computer.

Figure 28:
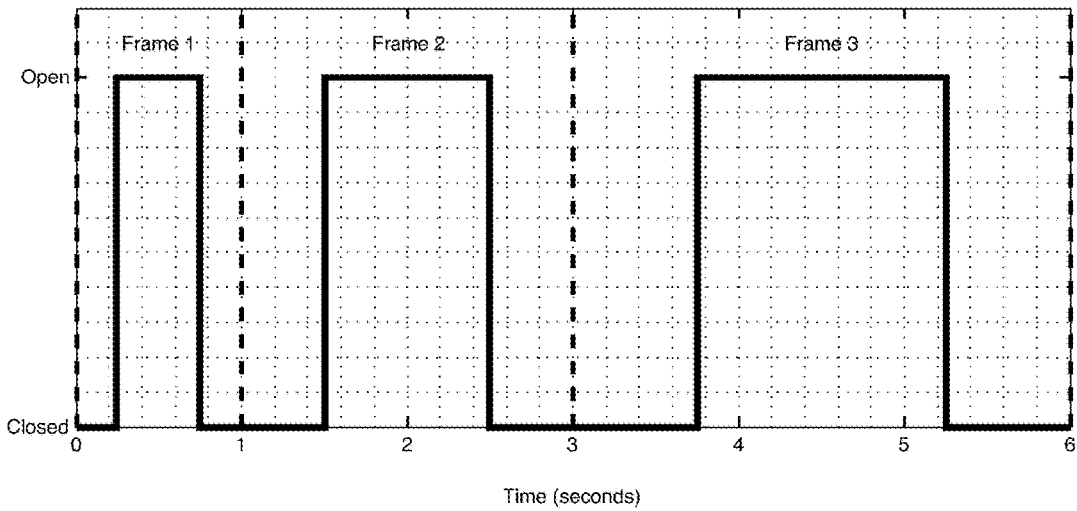
FIG. 28 illustrates an example of exposure timing and LCD exposure control.
Figure 28:
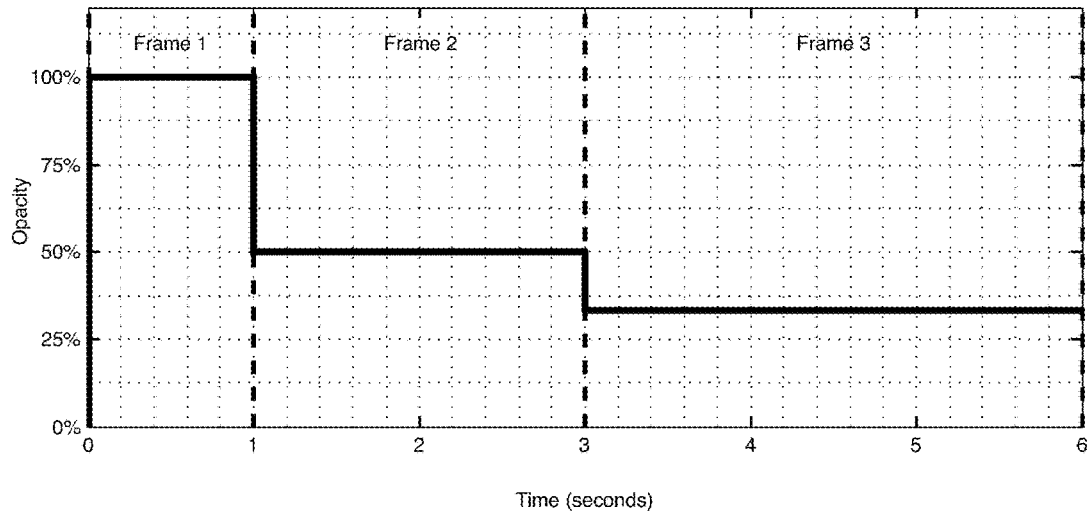

FIG. 28 illustrates an example of exposure timing and LCD exposure control for a variable time lapse sequence of three frames where it is desired to have a 180-degree shutter for all three frames. The first frame covers a time period of one second, and the shutter is therefore open for 0.5 seconds. The LCD is set to have 100% transparency for frame one. Frame two covers two seconds, so the shutter will therefore be open for one second to achieve the 180-degree shutter angle. To compensate for this exposure, the LCD is set to 50% transparency. Frame three covers three seconds, so the shutter will be open for 1.5 seconds, and the LCD is therefore set to 33% transparency. In all three frames, the exposure to CCD or film is the same, and the 180-degree shutter look is maintained.

Another embodiment of the present invention comprises an apparatus and method to control the liquid crystal during each exposure to create time-variable, continuous exposure window values during the shutter exposure to tune the frequency response of the system.

Figure 29:
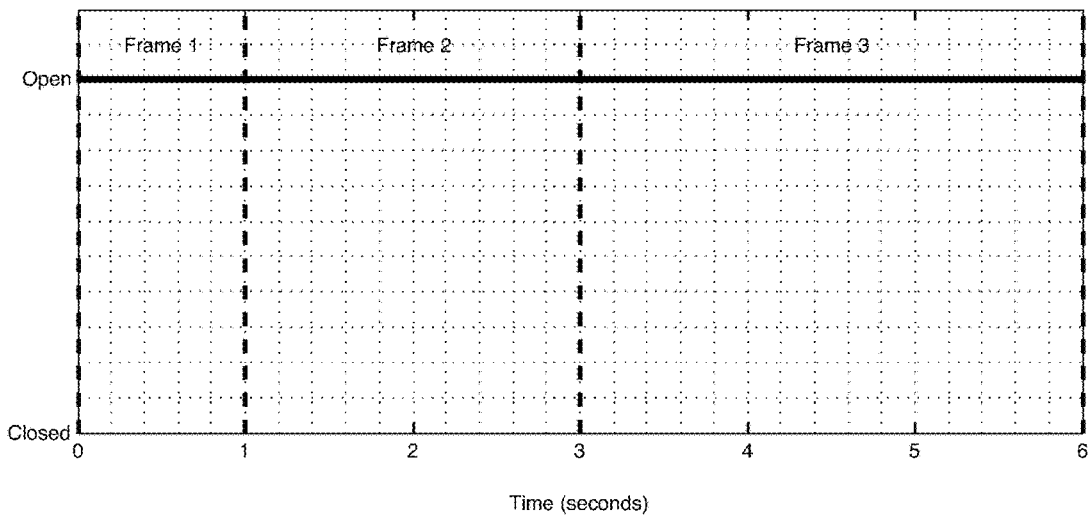
FIG. 29 is a plot illustrating exposure timing and LCD exposure control.
Figure 29:
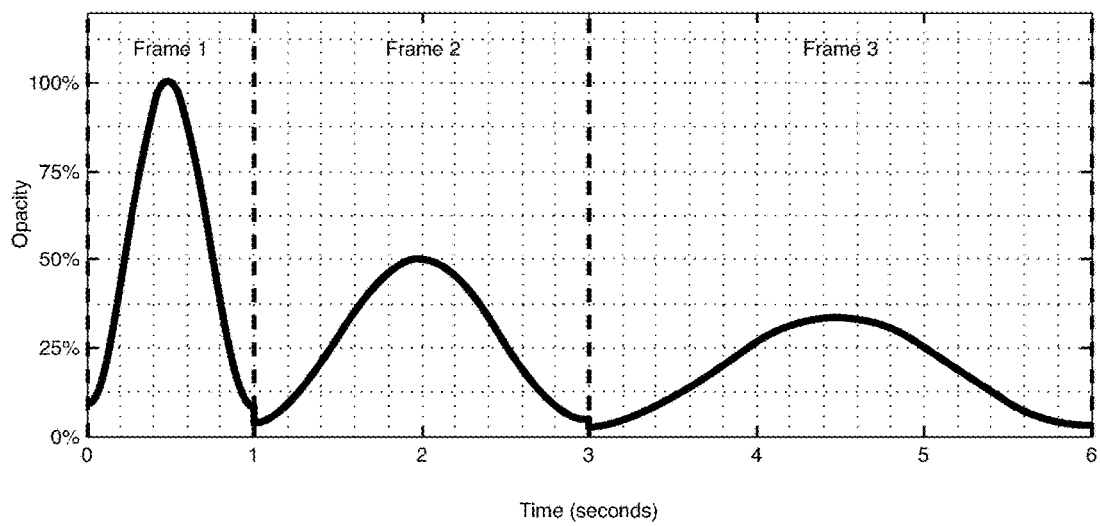

FIG. 29 is a plot illustrating exposure timing and LCD exposure control that maintains exposure for each frame as well as provides for temporal anti-aliasing and reducing aliasing. For each frame, the shutter of the camera is open for the entire duration of the frame. The LCD opacity is adjusted during the frame to achieve the exposure window function desired for temporal anti-aliasing and reducing aliasing. Additionally, the overall opacity of the LCD is adjusted to compensate for the frame time. In frame one, which lasts one second, the LCD opacity peaks at 100%. In frame two, which is two seconds long, the LCD opacity is half, or only 50% at peak. In frame three, which is three seconds long, the LCD opacity is one third, or 33% at peak. All three frames have the same motion frequency response tuned in and anti-aliasing properties, and will have the same exposure to the film or CCD.

The invention is further illustrated by the following non-limiting examples.

EXAMPLE 1

A standard motion picture camera was tested with the system illustrated in FIG. 21. A Red One digital cinematography camera was used, and was positioned to face the LED panel in a darkened room in accordance with the test setup shown in FIG. 21. The camera shutter angle was set to 180 degrees, and the frame rate was 24 frames per second. The panel was initially dark. The panel was ramped linearly in illumination to full brightness, with the illumination being recorded. The illumination ramp was used to linearize all data from this test.

Figure 22:
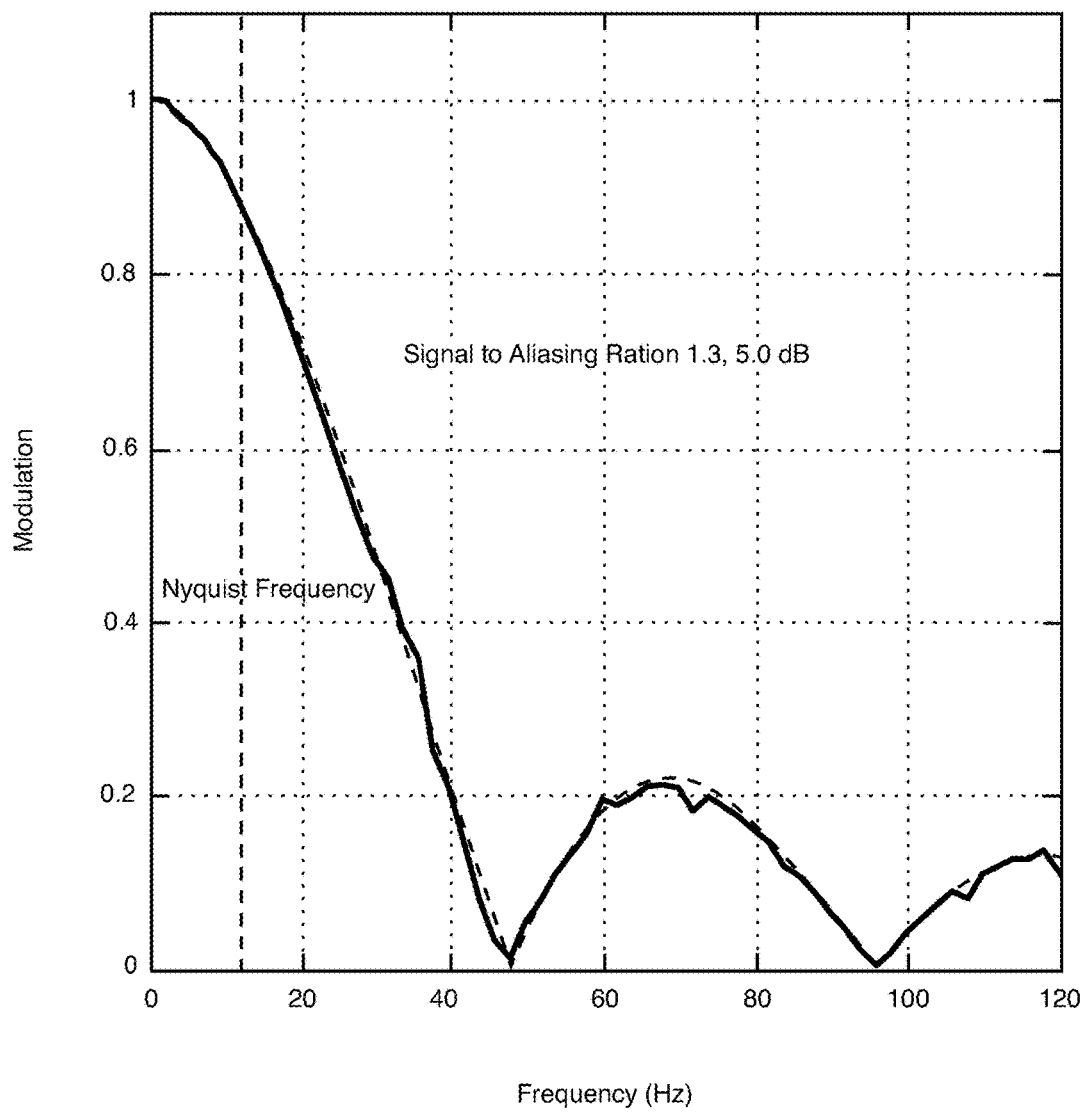
FIG. 22 illustrates an experimentally measured plot of modulation transfer function of prior-art imaging systems.

The LED panel was subsequently electrically powered to produce light intensity that varied sinusoidally as the panel was illuminated at increasing frequencies from 1 to 120 Hertz. The output was captured by the camera. A modulation transfer function plot was produced by plotting the measured amplitude, or modulation, of each sine wave recorded by the camera. The resulting plot is shown in FIG. 22. The solid line represents the measured data, and the dashed line represents the theoretical response. The Nyquist frequency, 12 Hertz, is indicated on the plot with a vertical dashed line. FIG. 22 is the measured modulation transfer function in the time domain of the camera.

EXAMPLE 2

A standard motion picture camera was tested for tuning or obtaining a time domain frequency response with system 160 for creating a time-varying exposure window value shown in FIG. 7A with test system 210 illustrated in FIG. 21. A Red One digital cinematography camera was used. An LCD shutter with timing control system was attached to the front of the lens. The LCD prefiltering system produced the exposure window function illustrated in FIG. 7A. The camera faced the LED panel in a darkened room. The camera shutter angle was set to 360 degrees, and the frame rate was 24 frames per second. The panel was initially dark. The panel was ramped linearly in illumination to full brightness, with the illumination being recorded. The illumination ramp was used to linearize all data from this test.

Figure 23:
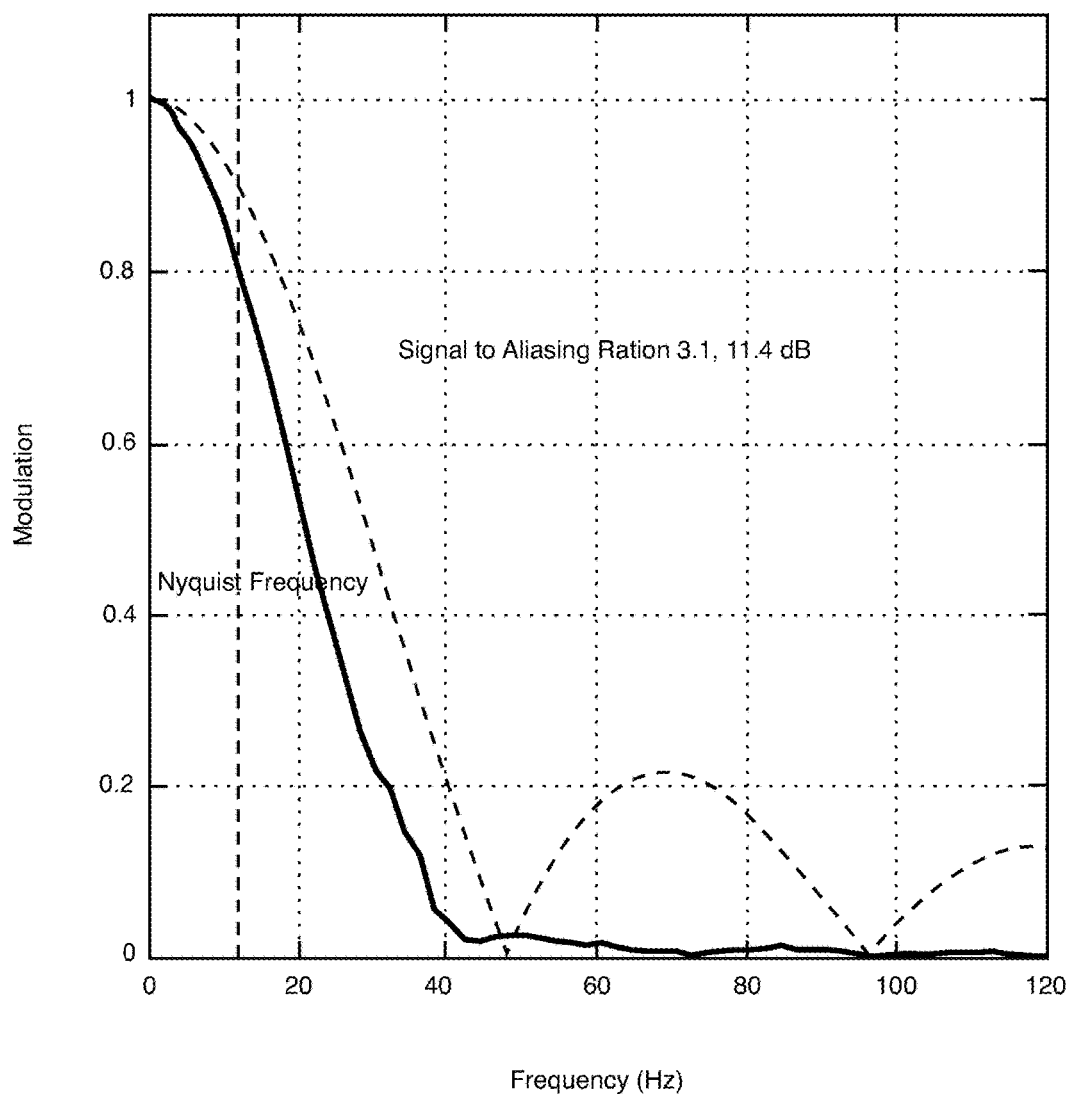
FIG. 23 illustrates an experimentally measured modulation transfer function plot for an imaging system employing the new exposure window function of this invention.

The LED panel was subsequently driven to produce light intensity varying sinusoidally in a series of increasing frequencies from 1 to 120 Hertz. The output was captured by the camera. A modulation transfer function plot was produced by plotting the measured amplitude, or modulation, of each sine wave recorded by the camera. The plot is shown in FIG. 23. The solid line represents the measured data, and the dashed line represents the theoretical response. The Nyquist frequency, 12 Hertz, is indicated with a vertical dashed line. FIG. 23 is the measured modulation transfer function in the time domain of the camera.

EXAMPLE 3

A standard motion picture camera with the embodiment illustrated in FIG. 16A was tested with the test system illustrated in FIG. 21. A digital postfilter and a Red One digital cinematography camera were used. An LCD shutter with a timing control system was attached to the front of the lens, producing the exposure window function shown in FIG. 7A. The camera was placed to face the LED panel in a darkened room. The camera shutter angle was set to 360 degrees and the frame rate employed was 24 frames per second. The panel was initially dark. The panel was ramped linearly in illumination to full brightness, with the illumination being recorded. The illumination ramp was used to linearize all data from the following test.

The LED panel was then driven to produce light intensity varying sinusoidally in a series of increasing frequencies from 1 to 120 Hertz. The output was captured by the camera. The resulting digital frame sequence was then sharpened along the time domain by application of a three-element convolutional filter.

Figure 24:
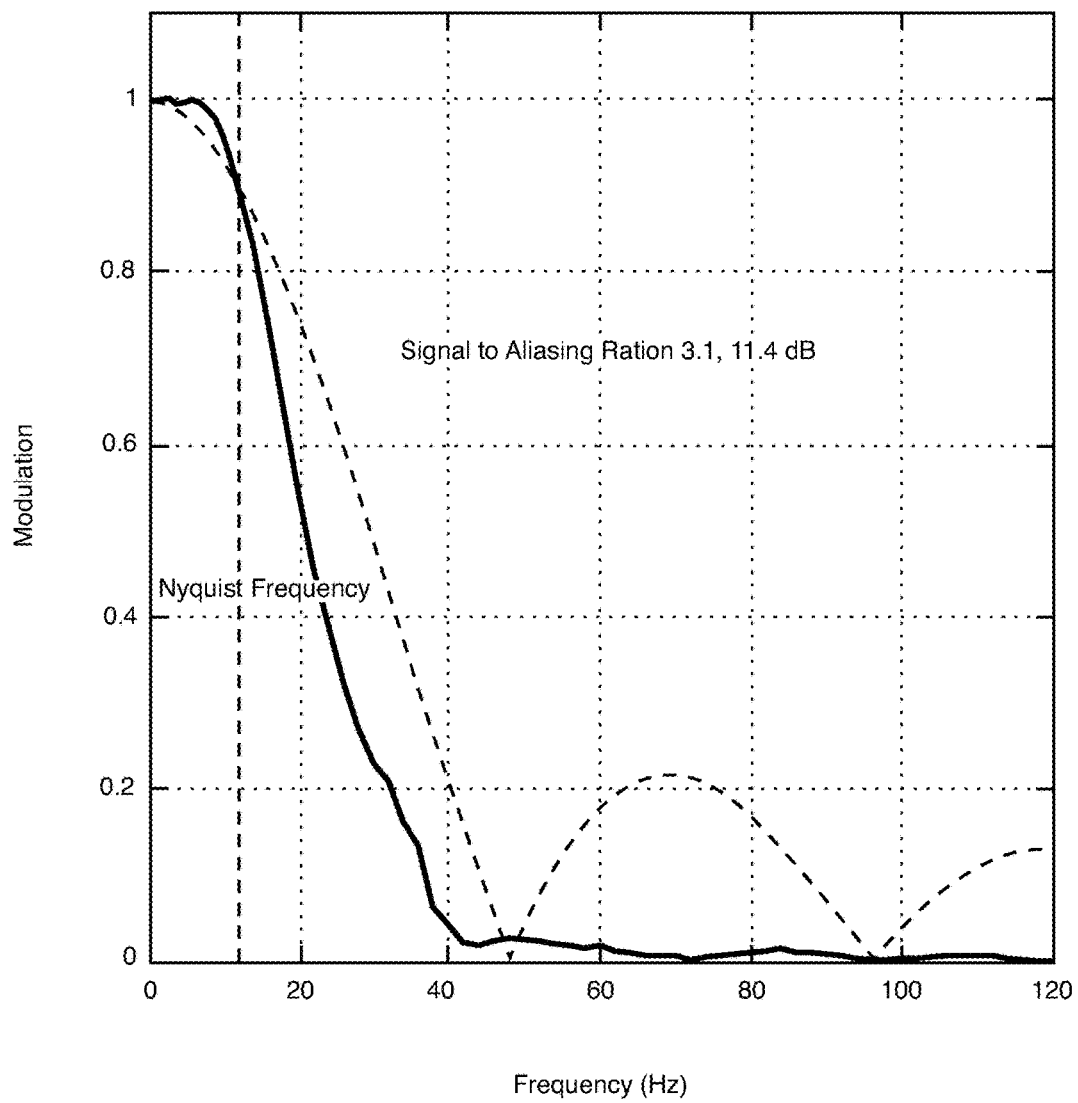
FIG. 24 illustrates an experimentally measured modulation transfer function plot for an imaging system employing the new exposure window function of this invention as well as the postfiltering of this invention.

A modulation transfer function plot was produced by plotting the measured amplitude, or modulation, of each sine wave recorded by the camera. The plot is shown in FIG. 24. The solid line represents the measured data, and the dashed line represents the theoretical response. The Nyquist frequency, 12 Hertz, is indicated with a vertical dashed line.

The preceding examples can be repeated with similar success by substituting generically or specifically described operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents.

What is claimed is:

1. A system comprising:
   an image sensor configured to generate a plurality of consecutive image frames;
   an optical filter having an opacity that is adjustable, the optical filter being disposed in an optical path of the image sensor and configured to vary an amount of light incident on the image sensor responsive to a control signal; and
   a controller configured to generate the control signal to vary the opacity during individual image frame periods of the plurality of consecutive image frames so that:
   the opacity decreases during a first part of the individual image frame periods and increases during a second part of the individual image frame periods, and
   object motion above a Nyquist frequency is filtered by the optical filter prior to detection by the image sensor.

2. The system of claim 1, wherein the controller is configured to generate the control signal to vary the opacity during the individual image frame periods so that the decrease in the opacity during the first part of the individual image frame periods and the increase in the opacity during the second part of the individual image frame periods are substantially symmetric about a minimum opacity level of the opacity during the individual image frame periods.

3. The system of claim 1, wherein the first part of the individual image frame periods and the second part of the individual image frame periods have the same duration.

4. The system of claim 1, wherein the opacity is substantially the same across an entire filter surface of the optical filter at a first time during the individual image frame periods.

5. The system of claim 1, wherein the controller is configured to generate the control signal to vary the opacity during the individual image frame periods so that a minimum opacity level of the opacity occurs mid-way during the individual image frame periods.

6. The system of claim 1, wherein the controller is configured to generate the control signal to vary the opacity during the individual image frame periods so that the opacity transitions from a first opacity level to a 50% opacity level and from the 50% opacity level to a second opacity level, the first opacity level being below the 50% opacity level and the second opacity level being above the 50% opacity level.

7. The system of claim 1, wherein the optical filter comprises a variable opacity liquid crystal.

8. The system of claim 1, wherein an amplitude of the control signal varies over time, and a level of the opacity during the individual image frame periods corresponds to the amplitude during the individual image frame periods.

9. The system of claim 1, wherein the control signal is a square wave.

10. The system of claim 1, wherein the optical filter is disposed before the image sensor in the optical path and after a lens in the optical path so that the light passes through the lens and the optical filter before reaching the image sensor.

11. The system of claim 1, further comprising a device housing configured to enclose the image sensor and the controller, the optical filter being disposed external to the device housing.

12. A method comprising:
    generating, with a processor, a control signal to control an opacity of an optical filter disposed in an optical path of an image sensor;
    varying the opacity during individual image frame periods of a plurality of consecutive image frames responsive to the control signal so that:
    an amount of light incident on the image sensor varies during the individual image frame periods,
    the opacity decreases during a first part of the individual image frame periods and increases during a second part of the individual image frame periods, and
    the opacity varies during the individual image frame periods in a way that diminishes an impact of temporal aliasing that is capturable by the image sensor; and
    generating, with the image sensor, the plurality of consecutive image frames responsive to the light incident on the image sensor.

13. The method of claim 12, wherein said varying comprises varying the opacity during the individual image frame periods so that the decrease in the opacity during the first part of the individual image frame periods and the increase in the opacity during the second part of the individual image frame periods are substantially symmetric about a minimum opacity level of the opacity during the individual image frame periods.

14. The method of claim 12, wherein the first part of the individual image frame periods and the second part of the individual image frame periods have the same duration.

15. The method of claim 12, wherein said varying comprises varying the opacity during the individual image frame periods so that the opacity is substantially the same across an entire filter surface of the optical filter at a first time during the individual image frame periods.

16. The method of claim 12, wherein said varying comprises varying the opacity during the individual image frame periods so that a minimum opacity level of the opacity occurs mid-way during the individual image frame periods.

17. The method of claim 12, wherein said varying comprises varying the opacity during the individual image frame periods so that the opacity transitions from a first opacity level to a 50% opacity level and from the 50% opacity level to a second opacity level, the first opacity level being below the 50% opacity level and the second opacity level being above the 50% opacity level.

18. The method of claim 12, wherein the optical filter comprises a variable opacity liquid crystal.

19. The method of claim 12, wherein an amplitude of the control signal varies over time, and said varying comprises varying the opacity during the individual image frame periods so that a level of the opacity during the individual image frame periods corresponds to the amplitude during the individual image frame periods.

20. The method of claim 12, wherein the control signal is a square wave.

21. The method of claim 12, further comprising receiving the light through a lens and then the optical filter prior to the light reaching the image sensor.

22. The method of claim 12, wherein the optical filter is disposed external to a device housing that encloses the image sensor and the controller.

23. A method comprising:
   generating, with a processor, a control signal to control an opacity of an optical filter disposed in an optical path of an image sensor;
   varying the opacity during individual image frame periods of a plurality of consecutive image frames responsive to the control signal so that:
      an amount of light incident on the image sensor varies during the individual image frame periods,
      the opacity decreases during a first part of the individual image frame periods and increases during a second part of the individual image frame periods, and
      object motion above a Nyquist frequency is filtered by the optical filter prior to detection by the image sensor; and
   generating, with the image sensor, the plurality of consecutive image frames responsive to the light incident on the image sensor.

24. A system comprising:
   an image sensor configured to generate a plurality of consecutive image frames;
   an optical filter having an opacity that is adjustable, the optical filter being disposed in an optical path of the image sensor and configured to vary an amount of light incident on the image sensor responsive to a control signal; and
   a controller configured to generate the control signal to vary the opacity during individual image frame periods of the plurality of consecutive image frames so that:
      the opacity decreases during a first part of the individual image frame periods and increases during a second part of the individual image frame periods, and
      the opacity varies during the individual image frame periods in a way that diminishes an impact of temporal aliasing that is capturable by the image sensor.

* * * * *